(12) United States Patent
Danilov et al.

(10) Patent No.: US 10,901,635 B2
(45) Date of Patent: Jan. 26, 2021

(54) MAPPED REDUNDANT ARRAY OF INDEPENDENT NODES FOR DATA STORAGE WITH HIGH PERFORMANCE USING LOGICAL COLUMNS OF THE NODES WITH DIFFERENT WIDTHS AND DIFFERENT POSITIONING PATTERNS

(71) Applicant: EMC IP Holding Company LLC, Hopkinton, MA (US)

(72) Inventors: Mikhail Danilov, Saint Petersburg (RU); Yohannes Altaye, Dumfries, VA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 28 days.

(21) Appl. No.: 16/209,185

(22) Filed: Dec. 4, 2018

(65) Prior Publication Data

US 2020/0174684 A1 Jun. 4, 2020

(51) Int. Cl.
*G06F 12/00* (2006.01)
*G06F 3/06* (2006.01)

(52) U.S. Cl.
CPC ............ *G06F 3/0631* (2013.01); *G06F 3/061* (2013.01); *G06F 3/067* (2013.01); *G06F 3/0644* (2013.01); *G06F 3/0689* (2013.01)

(58) Field of Classification Search
CPC ...... G06F 3/0631; G06F 3/0644; G06F 3/061; G06F 3/067; G06F 3/0689
USPC ....................................................... 711/114
See application file for complete search history.

(56) References Cited

U.S. PATENT DOCUMENTS

| 5,502,243 | A  | 3/1996  | Waller et al.    |
|-----------|----|---------|-----------------|
| 5,675,802 | A  | 10/1997 | Allen et al.    |
| 5,805,788 | A  | 9/1998  | Johnson         |
| 5,950,225 | A  | 9/1999  | Kleiman         |
| 7,389,393 | B1 | 6/2008  | Karr et al.     |
| 7,631,051 | B1 | 12/2009 | Fein et al.     |
| 7,664,839 | B1 | 2/2010  | Karr et al.     |
| 7,680,875 | B1 | 3/2010  | Shopiro et al.  |
| 7,721,044 | B1 | 5/2010  | Chatterjee et al. |

(Continued)

OTHER PUBLICATIONS

Martin Hosken, Developing a Hyper-Converged Storage Strategy for VMware vCloud Director with VMware vSAN, Jan. 2018 (Year: 2018).*

(Continued)

*Primary Examiner* — Mardochee Chery
(74) *Attorney, Agent, or Firm* — Amin, Turocy & Watson, LLP

(57) ABSTRACT

The described technology is generally directed towards mapping mapped storage clusters to resources of a real storage cluster in a way that provides high performance. In one aspect, the mapped storage clusters are divided into logical columns, with each logical column corresponding to a mapped node, and having a column height corresponding to a number of storage resources (e.g., disks) managed by that mapped node. The columns are logically positioned within a logical rectangle having dimensions of the real storage cluster. For example, the logical columns can be selected based on column height, and placed in the logical rectangle in a top-down, back and forth pattern. Once logically positioned, the logical columns in the logical rectangle establish the mapping (e.g., embodied in a mapping table) that results in high performance.

20 Claims, 14 Drawing Sheets

(56) References Cited

U.S. PATENT DOCUMENTS

| | | |
|---|---|---|
| 8,125,406 B1 | 2/2012 | Jensen et al. |
| 8,261,033 B1 | 9/2012 | Slik et al. |
| 8,370,542 B2 | 2/2013 | Lu et al. |
| 8,479,037 B1 | 7/2013 | Chatterjee et al. |
| 8,495,465 B1 | 7/2013 | Anholt et al. |
| 8,751,599 B2 | 6/2014 | Tran et al. |
| 8,751,740 B1 | 6/2014 | De Forest et al. |
| 8,799,746 B2* | 8/2014 | Baker .................. G06F 3/0683 714/769 |
| 8,832,234 B1 | 9/2014 | Brooker et al. |
| 8,856,619 B1 | 10/2014 | Cypher |
| 8,972,478 B1 | 3/2015 | Storer et al. |
| 9,003,086 B1 | 4/2015 | Schuller et al. |
| 9,052,942 B1 | 6/2015 | Barber et al. |
| 9,063,838 B1 | 6/2015 | Boyle et al. |
| 9,208,009 B2 | 12/2015 | Resch et al. |
| 9,218,135 B2 | 12/2015 | Miller et al. |
| 9,244,761 B2 | 1/2016 | Yekhanin et al. |
| 9,268,783 B1 | 2/2016 | Shilane et al. |
| 9,274,903 B1 | 3/2016 | Garlapati et al. |
| 9,280,430 B2 | 3/2016 | Saifare et al. |
| 9,405,483 B1 | 8/2016 | Wei et al. |
| 9,477,682 B1 | 10/2016 | Bent et al. |
| 9,641,615 B1 | 5/2017 | Robins et al. |
| 9,747,057 B1 | 8/2017 | Ramani et al. |
| 9,817,713 B2 | 11/2017 | Gupta et al. |
| 9,864,527 B1 | 1/2018 | Srivastav et al. |
| 9,942,084 B1 | 4/2018 | Sorenson, III |
| 10,001,947 B1 | 6/2018 | Chatterjee et al. |
| 10,055,145 B1 | 8/2018 | Danilov et al. |
| 10,127,234 B1 | 11/2018 | Krishnan et al. |
| 10,216,770 B1 | 2/2019 | Kulesza et al. |
| 10,242,022 B1 | 3/2019 | Jain et al. |
| 10,282,262 B2 | 5/2019 | Panara et al. |
| 10,361,810 B2 | 7/2019 | Myung et al. |
| 10,496,330 B1 | 12/2019 | Bernat et al. |
| 10,503,611 B1 | 12/2019 | Srivastav et al. |
| 10,613,780 B1 | 4/2020 | Naeni et al. |
| 10,733,053 B1 | 8/2020 | Miller et al. |
| 10,797,863 B2 | 10/2020 | Chen et al. |
| 2002/0166026 A1 | 11/2002 | Ulrich et al. |
| 2005/0080982 A1 | 4/2005 | Vasilevsky et al. |
| 2005/0088318 A1 | 4/2005 | Liu et al. |
| 2005/0108775 A1 | 5/2005 | Bachar et al. |
| 2005/0140529 A1 | 6/2005 | Choi et al. |
| 2005/0234941 A1 | 10/2005 | Watanabe |
| 2006/0047896 A1 | 3/2006 | Nguyen et al. |
| 2006/0075007 A1 | 4/2006 | Anderson et al. |
| 2006/0143508 A1 | 6/2006 | Mochizuki et al. |
| 2006/0265211 A1 | 11/2006 | Canniff et al. |
| 2007/0076321 A1 | 4/2007 | Takahashi et al. |
| 2007/0239759 A1 | 10/2007 | Shen et al. |
| 2007/0250674 A1 | 10/2007 | Findberg et al. |
| 2008/0222480 A1 | 9/2008 | Huang |
| 2008/0222481 A1 | 9/2008 | Huang |
| 2008/0244353 A1 | 10/2008 | Dholakia et al. |
| 2008/0320061 A1 | 12/2008 | Aszmann et al. |
| 2009/0070771 A1 | 3/2009 | Yuyitung et al. |
| 2009/0113034 A1 | 4/2009 | Krishnappa et al. |
| 2009/0172464 A1 | 7/2009 | Byrne et al. |
| 2009/0183056 A1 | 7/2009 | Aston |
| 2009/0204959 A1 | 8/2009 | Anand et al. |
| 2009/0240880 A1 | 9/2009 | Kawaguchi |
| 2009/0259882 A1 | 10/2009 | Shellhamer |
| 2010/0031060 A1 | 2/2010 | Chew et al. |
| 2010/0218037 A1 | 8/2010 | Swartz et al. |
| 2010/0293348 A1 | 11/2010 | Ye et al. |
| 2010/0332748 A1 | 12/2010 | Van Der Goot et al. |
| 2011/0029836 A1 | 2/2011 | Dhuse et al. |
| 2011/0106972 A1 | 5/2011 | Grube et al. |
| 2011/0107165 A1 | 5/2011 | Resch et al. |
| 2011/0138148 A1 | 6/2011 | Friedman et al. |
| 2011/0161712 A1 | 6/2011 | Athalye et al. |
| 2011/0196833 A1 | 8/2011 | Drobychev et al. |
| 2011/0246503 A1 | 10/2011 | Bender et al. |
| 2011/0292054 A1 | 12/2011 | Boker et al. |
| 2012/0023291 A1 | 1/2012 | Zeng et al. |
| 2012/0096214 A1 | 4/2012 | Lu et al. |
| 2012/0191675 A1 | 7/2012 | Kim et al. |
| 2012/0191901 A1 | 7/2012 | Norair |
| 2012/0204077 A1 | 8/2012 | D'Abreu et al. |
| 2012/0233117 A1 | 9/2012 | Holt et al. |
| 2012/0311395 A1 | 12/2012 | Leggette et al. |
| 2012/0317234 A1 | 12/2012 | Bohrer et al. |
| 2012/0321052 A1 | 12/2012 | Morrill et al. |
| 2013/0047187 A1 | 2/2013 | Frazier et al. |
| 2013/0054822 A1 | 2/2013 | Mordani et al. |
| 2013/0067159 A1 | 3/2013 | Mehra |
| 2013/0067187 A1 | 3/2013 | Moss et al. |
| 2013/0088501 A1 | 4/2013 | Fell |
| 2013/0097470 A1 | 4/2013 | Hwang et al. |
| 2013/0238932 A1 | 9/2013 | Resch |
| 2013/0246876 A1 | 9/2013 | Manssour et al. |
| 2013/0290482 A1 | 10/2013 | Leggette |
| 2013/0305365 A1 | 11/2013 | Rubin et al. |
| 2014/0040417 A1 | 2/2014 | Galdwin et al. |
| 2014/0064048 A1 | 3/2014 | Cohen et al. |
| 2014/0115182 A1 | 4/2014 | Sabaa et al. |
| 2014/0164430 A1 | 6/2014 | Hadjieleftheriou et al. |
| 2014/0164694 A1 | 6/2014 | Storer |
| 2014/0250450 A1 | 9/2014 | Yu et al. |
| 2014/0280375 A1 | 9/2014 | Rawson |
| 2014/0281804 A1 | 9/2014 | Resch |
| 2014/0297955 A1 | 10/2014 | Yamazaki et al. |
| 2014/0331100 A1 | 11/2014 | Dhuse et al. |
| 2014/0358972 A1 | 12/2014 | Guarrieri et al. |
| 2014/0359244 A1 | 12/2014 | Chambliss et al. |
| 2014/0380088 A1 | 12/2014 | Bennett et al. |
| 2014/0380125 A1 | 12/2014 | Calder et al. |
| 2015/0006846 A1 | 1/2015 | Youngworth |
| 2015/0074065 A1 | 3/2015 | Christ et al. |
| 2015/0112951 A1 | 4/2015 | Narayanamurthy et al. |
| 2015/0134626 A1 | 5/2015 | Theimer et al. |
| 2015/0142863 A1 | 5/2015 | Yuen et al. |
| 2015/0178007 A1 | 6/2015 | Moisa et al. |
| 2015/0186043 A1 | 7/2015 | Kesselman et al. |
| 2015/0303949 A1 | 10/2015 | Jafarkhani et al. |
| 2015/0331766 A1 | 11/2015 | Sarfare et al. |
| 2015/0370656 A1 | 12/2015 | Tsafrir et al. |
| 2016/0011935 A1 | 1/2016 | Luby |
| 2016/0011936 A1 | 1/2016 | Luby |
| 2016/0055054 A1 | 2/2016 | Patterson, III et al. |
| 2016/0162378 A1 | 6/2016 | Garlapati et al. |
| 2016/0169692 A1 | 6/2016 | Gupta |
| 2016/0170668 A1 | 6/2016 | Mehra |
| 2016/0217104 A1 | 7/2016 | Kamble et al. |
| 2016/0232055 A1 | 8/2016 | Vairavanathan et al. |
| 2016/0253400 A1 | 9/2016 | McAlister et al. |
| 2016/0277497 A1 | 9/2016 | Bannister et al. |
| 2016/0292429 A1 | 10/2016 | Manville et al. |
| 2016/0328295 A1 | 11/2016 | Baptist et al. |
| 2016/0357649 A1 | 12/2016 | Karrotu et al. |
| 2016/0371145 A1 | 12/2016 | Akutsu et al. |
| 2016/0378624 A1 | 12/2016 | Jenkins, Jr. et al. |
| 2016/0380650 A1 | 12/2016 | Calder et al. |
| 2017/0003880 A1 | 1/2017 | Fisher et al. |
| 2017/0004044 A1 | 1/2017 | Tormasov et al. |
| 2017/0017671 A1 | 1/2017 | Baptist et al. |
| 2017/0031945 A1 | 2/2017 | Sarab et al. |
| 2017/0097875 A1 | 4/2017 | Jess et al. |
| 2017/0102993 A1 | 4/2017 | Hu et al. |
| 2017/0116088 A1 | 4/2017 | Anami et al. |
| 2017/0187398 A1 | 6/2017 | Trusov |
| 2017/0187766 A1 | 6/2017 | Zheng et al. |
| 2017/0206025 A1 | 7/2017 | Viswanathan |
| 2017/0206135 A1 | 7/2017 | Zeng |
| 2017/0212680 A1 | 7/2017 | Waghulde |
| 2017/0212845 A1 | 7/2017 | Conway |
| 2017/0235507 A1 | 8/2017 | Sinha et al. |
| 2017/0262187 A1 | 9/2017 | Manzanares et al. |
| 2017/0268900 A1 | 9/2017 | Nicolaas et al. |
| 2017/0286516 A1 | 10/2017 | Horowitz et al. |
| 2017/0288701 A1 | 10/2017 | Slik et al. |
| 2017/0344285 A1 | 11/2017 | Choi et al. |

(56) References Cited

U.S. PATENT DOCUMENTS

| | | |
|---|---|---|
| 2018/0052744 A1 | 2/2018 | Chen et al. |
| 2018/0063213 A1 | 3/2018 | Bevilacqua-Linn et al. |
| 2018/0074881 A1 | 3/2018 | Burden |
| 2018/0121286 A1 | 5/2018 | Sipos |
| 2018/0129417 A1 | 5/2018 | Sivasubramanian et al. |
| 2018/0181324 A1 | 6/2018 | Danilov et al. |
| 2018/0181612 A1 | 6/2018 | Danilov et al. |
| 2018/0246668 A1 | 8/2018 | Sakashita et al. |
| 2018/0267856 A1 | 9/2018 | Hayasaka et al. |
| 2018/0267985 A1 | 9/2018 | Badey |
| 2018/0306600 A1 | 10/2018 | Nicolaas et al. |
| 2018/0307560 A1 | 10/2018 | Vishnumolakala et al. |
| 2018/0341662 A1 | 11/2018 | He |
| 2018/0375936 A1 | 12/2018 | Chirammal et al. |
| 2019/0028179 A1 | 1/2019 | Kalhan |
| 2019/0034084 A1 | 1/2019 | Nagarajan et al. |
| 2019/0043201 A1 | 2/2019 | Strong et al. |
| 2019/0043351 A1 | 2/2019 | Yang et al. |
| 2019/0050301 A1 | 2/2019 | Juniwal et al. |
| 2019/0065092 A1 | 2/2019 | Shah et al. |
| 2019/0065310 A1 | 2/2019 | Rozas |
| 2019/0114223 A1 | 4/2019 | Pydipaty et al. |
| 2019/0205437 A1 | 7/2019 | Larson et al. |
| 2019/0215017 A1 | 7/2019 | Danilov et al. |
| 2019/0220207 A1 | 7/2019 | Lingarajappa |
| 2019/0356416 A1 | 11/2019 | Yanovsky et al. |
| 2019/0384500 A1 | 12/2019 | Danilov et al. |
| 2019/0386683 A1 | 12/2019 | Danilov et al. |
| 2020/0026810 A1 | 1/2020 | Subramaniam et al. |
| 2020/0050510 A1 | 2/2020 | Chien et al. |
| 2020/0104377 A1 | 4/2020 | Earnesty, Jr. et al. |
| 2020/0117556 A1 | 4/2020 | Zou et al. |

OTHER PUBLICATIONS

Non-Final Office Action received for U.S. Appl. No. 16/261,549 dated Apr. 15, 2020, 22 pages.

Non-Final Office Action received for U.S. Appl. No. 16/374,726 dated Jun. 2, 2020, 47 pages.

Natarajan, RAID 0, RAID 1, RAID 5, RAID 10 Explained with Diagrams, Aug. 10, 2010, thegeekstuff.com (18 pages).

Final Office Action received for U.S. Appl. No. 16/010,255 dated Jul. 23, 2020, 36 pages.

Office Action received for U.S. Appl. No. 16/010,246 dated Jul. 27, 2020 36 pages.

Office Action received for U.S. Appl. No. 16/177,278, dated Aug. 21, 2020, 53 pages.

Office Action received for U.S. Appl. No. 16/179,486, dated Aug. 13, 2020, 64 pages.

Silo et al., "GeoScale: Providing Geo-Elasticity in Distributed Clouds" 2016 IEEE International Conference on Cloud Engineering, 4 pages.

Silo et al., "Providing Geo-Elasticity in Geographically Distributed Clouds". ACM Transactions on Internet Technology, vol. 18, No. 3, Article 38. Apr. 2018.27 pages.

Office Action received for U.S. Appl. No. 16/254,073, dated Aug. 18, 2020, 62 pages.

Non-Final Office Action received for U.S. Appl. No. 16/177,285 dated Jul. 22, 2020, 31 pages.

Non-Final Office Action received for U.S. Appl. No. 16/261,547 dated Sep. 3, 2020, 26 pages.

Non-Final Office Action received for U.S. Appl. No. 16/261,548 dated Aug. 21, 2020, 42 pages.

Notice of Allowance received for U.S. Appl. No. 16/261,549 dated Jul. 17, 2020, 40 pages.

Qiang et al., "Dynamics Process of Long-running Allocation/Collection in Linear Storage Space", International Conference on Networking, Architecture, and Storage (NAS 2007), Guilin, 2007, pp. 209-216.

Non-Final Office Action received for U.S. Appl. No. 16/374,725 dated Aug. 19, 2020, 50 pages.

Aiikipedia "Garbage Collection", Url: https://en.wikipedia.org/wiki/Garbage_collection_(computer science) #Availability (Year: 2017) retrieved using the WayBackMachine, Sep. 8, 2017, 8 pages.

Wikipedia "Erasure code", URL: https://web.archive.org/web/20170908171158/https://en.wikipedia.org/wiki/ Erasure_code (Year: 2017), retrieved using the WayBackMachine, Sep. 8, 2017, 5 pages.

Wikipedia "Front and back ends" URL: https://en.wikipedia.org/wiki/Front_and_back_ends (Year:2019), Sep. 6,2019, 4 pages.

Huang et al., "Scale-RS: An Efficient Scaling Scheme for Rs-Coded Storage Clusters," in IEEE Transactions on Parallel and Distributed Systems, vol. 26, No. 6, pp. 1704-1717, Jun. 1, 2015.

Non-Final Office Action received for U.S. Appl. No. 16/457,615 dated Jul. 20, 2020, 34 pages.

Final Office Action received for U.S. Appl. No. 15/662,273 dated May 15, 2019, 33 pages.

Non-Final Office Action received for U.S. Appl. No. 15/965,479 dated Apr. 15, 2019, 21 pages.

Non-Final Office Action received for U.S. Appl. No. 15/794,950 dated Jul. 9, 2019, 29 pages.

Final Office Action received for U.S. Appl. No. 15/651,504 dated Sep. 18, 2019, 15 pages.

Non-Final Office Action received for U.S. Appl. No. 15/952,179 dated Sep. 10, 2019, 42 pages.

Wikipedia, "Standard Raid Levels - Raid 6", URL: https://en.wikipedia.org/wiki/Standard_RAID_levels#RAID_6 , Oct. 18, 2019, 11 pages.

Non-Final Office Action received for U.S. Appl. No. 15/656,382 dated Nov. 1, 2019, 47 pages.

Final Office Action received for U.S. Appl. No. 15/952,179 dated Nov. 26, 2019, 53 pages.

Non Final Office Action received for U.S. Appl. No. 16/024,314 dated Nov. 25, 2019, 42 pages.

Non- Final Office Action received for U.S. Appl. No. 16/177, 278 dated Dec. 2, 2019, 55 pages.

Non-Final Office Action received for U.S. Appl. No. 15/651,504 dated Dec. 31, 2019, 18 pages.

Non-Final Office Action received for U.S. Appl. No. 16/010,246 dated Dec. 5, 2019, 67 pages.

Stonebreaker et al. "Distributed Raid—A New Multiple Copy Algorithm.", IEEE Icde, 1990, pp. 430-437.

Muralidhar et al. "f4: Facebook's Warm Blob Storage System", USENIX. OSDI, Oct., 2014, pp. 383-398.

Final Office Action dated Feb. 12, 2020 for U.S. Appl. No. 16/024,314, 29 pages.

Non-Final Office Action received for U.S. Appl. No. 16/010,255 dated Jan. 9, 2020, 31 pages.

Office Action dated Feb. 05, 2020 for U.S. Appl. No. 16/261,551, 30 pages.

Non-Final Office Action received for U.S. Appl. No. 16/228,612 dated Feb. 27, 2020, 49 pages.

Final Office Action received for U.S. Appl. No. 16/010,246 dated Mar. 16, 2020, 33 pages.

Final Office Action received for U.S. Appl. No. 15/656,382 dated Apr. 06, 2020, 31 pages.

Non-Final Office Action received for U.S. Appl. No. 15/582,167 dated Sep. 7, 2018, 19 pages.

Non-Final Office Action received for U.S. Appl. No. 15/952,179 dated Apr. 20, 2020, 68 pages.

Notice of Allowance received for U.S. Patent Application No. 16/240,193, dated May 4, 2020, 46 pages.

Final Office Action received for U.S. Patent Application No. 16/177,278, dated May 11, 2020, 53 pages.

Non-Final Office Action received for U.S. Appl. No. 16/231,018 dated May 8, 2020, 78 pages.

Notice of Allowance dated May 11, 2020 for U.S. Appl. No. 16/240,193, 24 pages.

Non-Final Office Action received for U.S. Appl. No. 16/228,624 dated Jun. 24, 2020, 65 pages.

Non-Final Office Action received for U.S. Appl. No. 16/240,272 dated Jun. 29, 2020, 64 pages.

Non-Final Office Action received for U.S. Appl. No. 16/228,612 dated Jun. 29, 2020, 62 pages.

(56) References Cited

OTHER PUBLICATIONS

Non-Final Office Action received for U.S. Appl. No. 16/526,142 dated Oct. 15, 2020, 21 pages.
Notice of Allowance received U.S. Appl. No. 16/228,612 date Oct. 20, 2020, 84 pages.
iFIOU, et al. "Fast Erasure Coding for Data Storage: A Comprehensive Study of the Acceleration Techniques" Proceedings of the 17th USEMOX Conference on File and Storage Technologies (Fast '19), [https://www.usenix.org/ aonference/fast19/presentation/zhou], Feb. 2019, Boston, MA, USA. 14 pages.
Office Action for U.S. Appl. No. 16/010,255 dated Oct. 29, 2020, 65 pages.
Office Action for U.S. Appl. No. 16/240,272 dated Oct. 27, 2020, 42 pages.
Office Action for U.S. Appl. No. 16/399,902 dated Oct. 28, 2020, 83 pages.
Notice of Allowance received for U.S. Appl. No. 16/374,726 dated Nov. 20, 2020, 78 pages.
Final Office Action received for U.S. Appl. No. 16/228,624 dated Dec. 1, 2020, 63 pages.
Office Action for U.S. Appl. No. 16/570,657 dated Nov. 27, 2020, 76 pages.

\* cited by examiner

… (1)

MAPPED REDUNDANT ARRAY OF INDEPENDENT NODES FOR DATA STORAGE WITH HIGH PERFORMANCE USING LOGICAL COLUMNS OF THE NODES WITH DIFFERENT WIDTHS AND DIFFERENT POSITIONING PATTERNS

TECHNICAL FIELD

The subject application generally relates to data storage, more particularly, to mapping storage devices to facilitate performance, and related embodiments.

BACKGROUND

Conventional data storage techniques can store data in one or more arrays of data storage devices. As an example, data can be stored in an ECS (formerly known as ELASTIC CLOUD STORAGE) system, hereinafter ECS system, such as is provided by DELL EMC. A mapped Redundant Array of Independent Nodes (RAIN), also referred to a mapped cluster, is a virtualization technology based on a relationship of logically mapped nodes to an underlying real storage device (e.g., disk) pool, comprising a real cluster (RAIN). A mapping table that can be accessed by software/firmware maintains information about the relationship between the mapped nodes and the disks in the disk pool/real cluster.

A real cluster comprises N nodes and each cluster node manages M disks; the N×M disks form the disk pool. A mapped cluster can be built using disks from the disk pool, with N' mapped nodes, and one real cluster may accommodate two or more mapped clusters. A mapped node can manage M' disks, and M' can be greater than M. There are generally no limitations on distributing disks among mapped nodes, except that (based on good data storage practices) there can be a constraint that two or more disks managed by one real node cannot go to different mapped nodes of one mapped cluster; (otherwise a failure of a real node would impact two or more mapped nodes).

As with any virtualization technology, the use of mapped clusters penalizes performance. There are many possible ways to map mapped clusters to real resources; and the mapping that is chosen determines the extent to which performance is affected.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
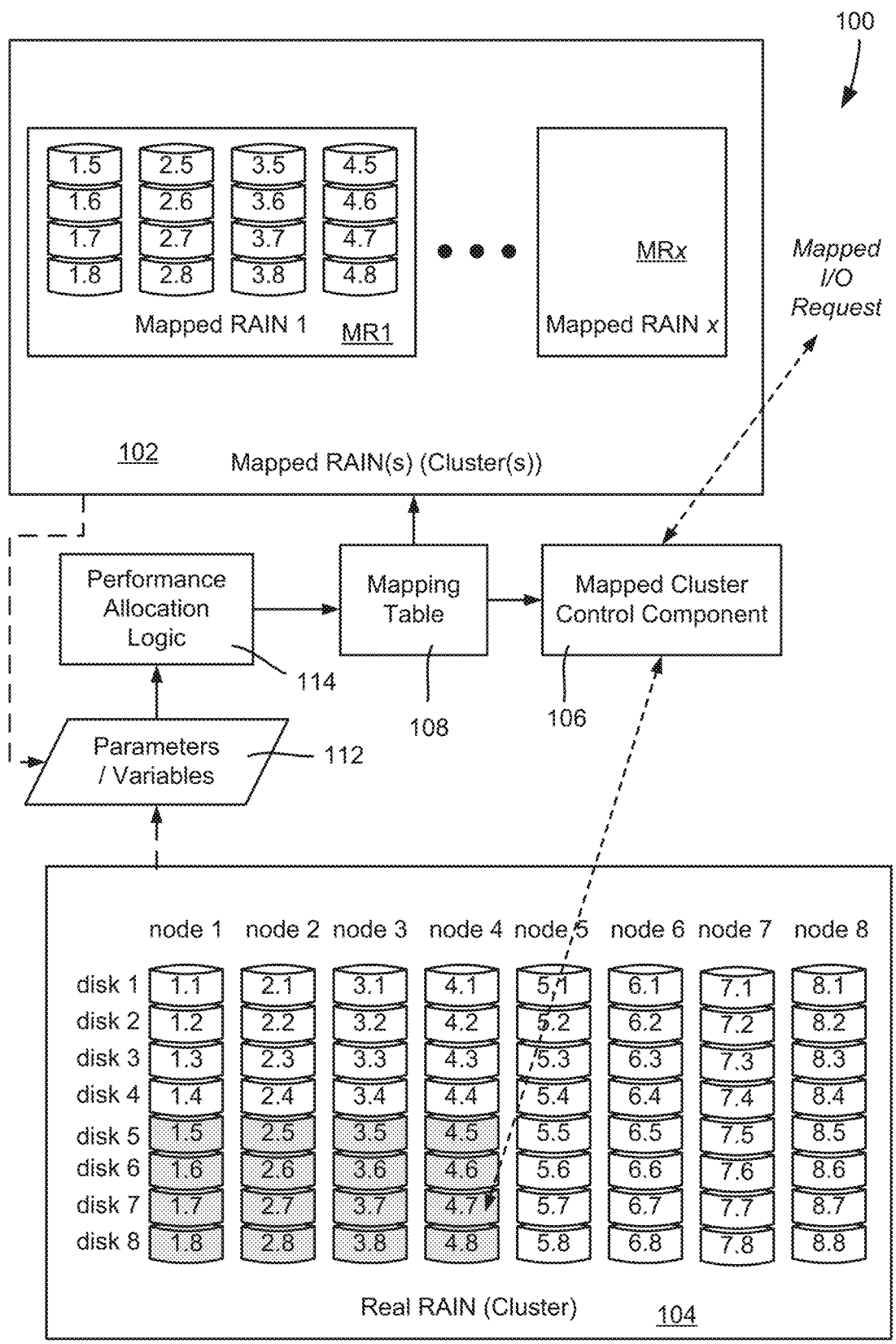
FIG. 1 is an example block diagram representation of a mapped cluster (RAIN) in which disks are mapped to real disks for performance, in accordance with various aspects and implementations of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components and operations are shown. In the following description, for purposes of explanation, numerous specific details are set forth in order to provide a thorough understanding of the various embodiments. However, the subject disclosure may be embodied in many different forms and should not be construed as limited to the examples set forth herein.

As will be understood, the implementation(s) described herein are non-limiting examples, and variations to the technology can be implemented. For instance, many of the examples herein are based on dividing a mapped Redundant Array of Independent Nodes (RAIN, used synonymously herein with "mapped cluster" and/or "mapped nodes") into single-width columns of mapped nodes, and using a top-down, back and forth pattern to position the columns to align with nodes of a real RAIN (used synonymously herein with "real cluster"). However, the technology described herein can provide benefits with different width columns, can use different positioning patterns, and so forth. Moreover, the term "disk" or "disks" is used in many of the examples described herein, however it is understood that any data storage resource/storage device may be used instead of or in addition to disks. As such, any of the embodiments, aspects, concepts, structures, functionalities, implementations and/or examples described herein are non-limiting, and the technology may be used in various ways that provide benefits and advantages in virtualization and data storage technologies in general.

As set forth above, data storage techniques can conventionally store data in one or more arrays of data storage devices. Data can conventionally be stored in a group of nodes formatted for a given cluster, for example, with the disks of nodes being considered part of a group. As a result, a node with many disks can, in some conventional embodiments, comprise a large amount of storage that can go underutilized. As such, it can be desirable to have more granular logical storage groups that can employ portions of larger real groups, thereby facilitating efficient computer resource usage, e.g., via large real groups, but still providing smaller logical groups that can be used more efficiently for storing smaller amounts of data therein. The concept of mapped RAINs provides such smaller logical groups.

FIG. 1 is an illustration of a system 100 that can facilitate storage of data in one or more mapped RAINs 102, in accordance with aspects of the subject disclosure. The system 100 can comprise a real RAIN/cluster 104 comprising one or more hardware nodes that each comprise one or more storage resources/devices, e.g., hard disks, optical storage, solid state storage, etc. For example, the shaded storage devices (identified by node no. disk no. as 1.5-1.8, 2.5-2.8. 3.5-3.8 and 4.5-4.8) of the real cluster 104 are shown as having been mapped to a mapped RAIN MR1.

Once mapped as described herein, the real RAIN/cluster 104 can receive data I/O requests (data writes/output data reads) corresponding to logical storage locations in a mapped RAIN MR1-MRx, e.g., data in real storage is accessed by I/O referencing mapped RAIN cluster storage 102. The data as stored in portions of the one or more storage devices of the real cluster 104 can be accessed by a mapped cluster control component 106 according to a logical mapping of the storage space, e.g., maintained in a mapping table 108, as generally represented in FIG. 1 by the slanted, dashed lines.

In an aspect, any of the mapped cluster(s) 102 can be a logical allocation of storage space of a real cluster 104. In an embodiment, a portion of a real disk can be comprised in a real node that can be comprised in a real cluster and, furthermore, a portion of the real disk can correspond to a portion of a mapped disk, a mapped disk can comprise one or more portions of one or more real disks, a mapped node can comprise one or more portions of one or more real nodes, a mapped cluster can comprise one or more portions of one or more real clusters, etc.

Described herein is a technology for allocating the storage resources of a real cluster to mapped clusters in a way that provides for high performance (relative, for example, to random or otherwise unplanned allocation). In general, the closer the resource mapping for a mapped RAIN is to a real RAIN, the higher the performance. To this end, one mapped node needs to manage a set of disks from one real node, and the storage services of the mapped node need to run on the real node to which the set of disks is connected.

To this end, as shown in FIG. 1, based on various parameters 112 as described herein, performance allocation logic 114 generates the mappings for the mapping table in a way that is performant. As will be understood, the performance allocation logic 114 operates such that one mapped node manages a set of disks from one real node, and the storage services of the mapped node can run on the real node to which the set of disks is connected.

Figure 2:
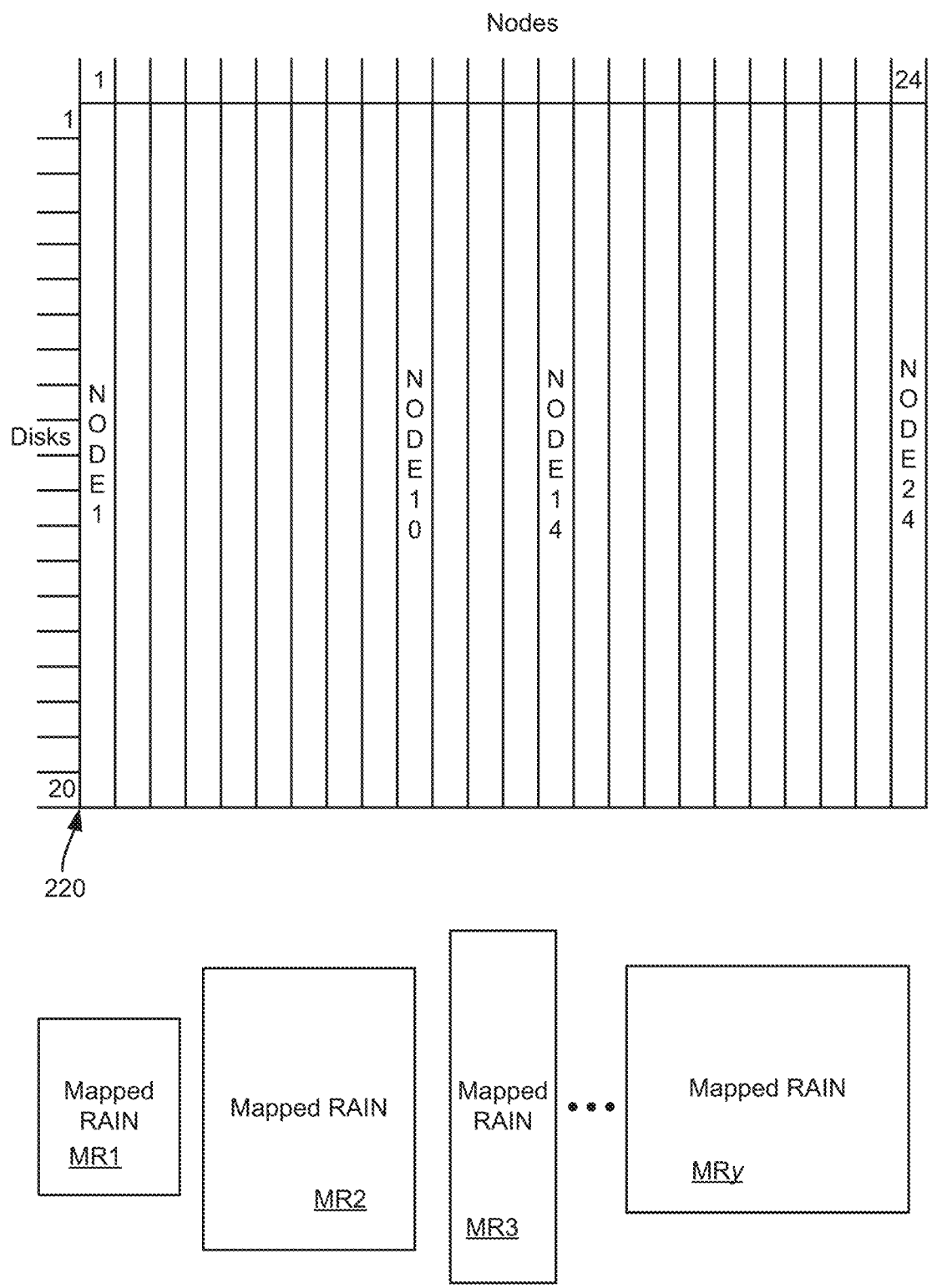
FIG. 2 is an example block diagram representation of selecting disks from a real cluster for performant mapping to mapped clusters, in accordance with various aspects and implementations of the subject disclosure.

FIG. 2 shows an example of a 24 node×20 disk real disk cluster, which forms a logical rectangle 220. As is represented in FIG. 2, a set of mapped RAINs (shown in FIG. 2 as MR1-MRy) can have mapped RAINs of any desired number and any desired dimensions, (provided they fit into the real RAIN's rectangular space in this example); the number of mapped RAINs and their respective dimensions, along with the real RAIN dimensions, comprise the parameters/variables 112 that the performance allocation logic deals with as described herein.

Figure 3:
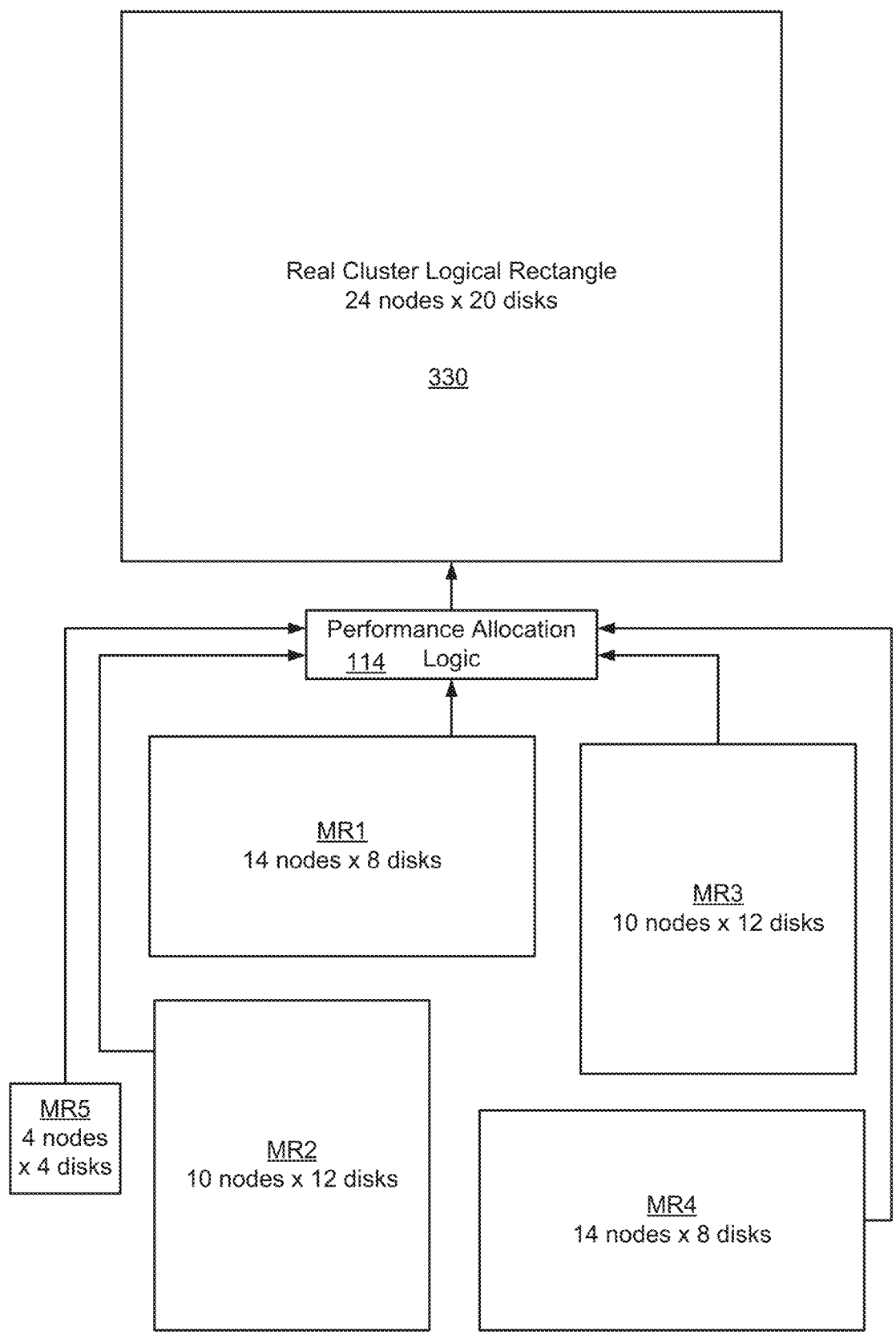
FIG. 3 is an example block diagram representation of mapped clusters for mapping to real disks using a logical rectangle that represents nodes and disks of a real cluster, in accordance with various aspects and implementations of the subject disclosure.
Figure 4:
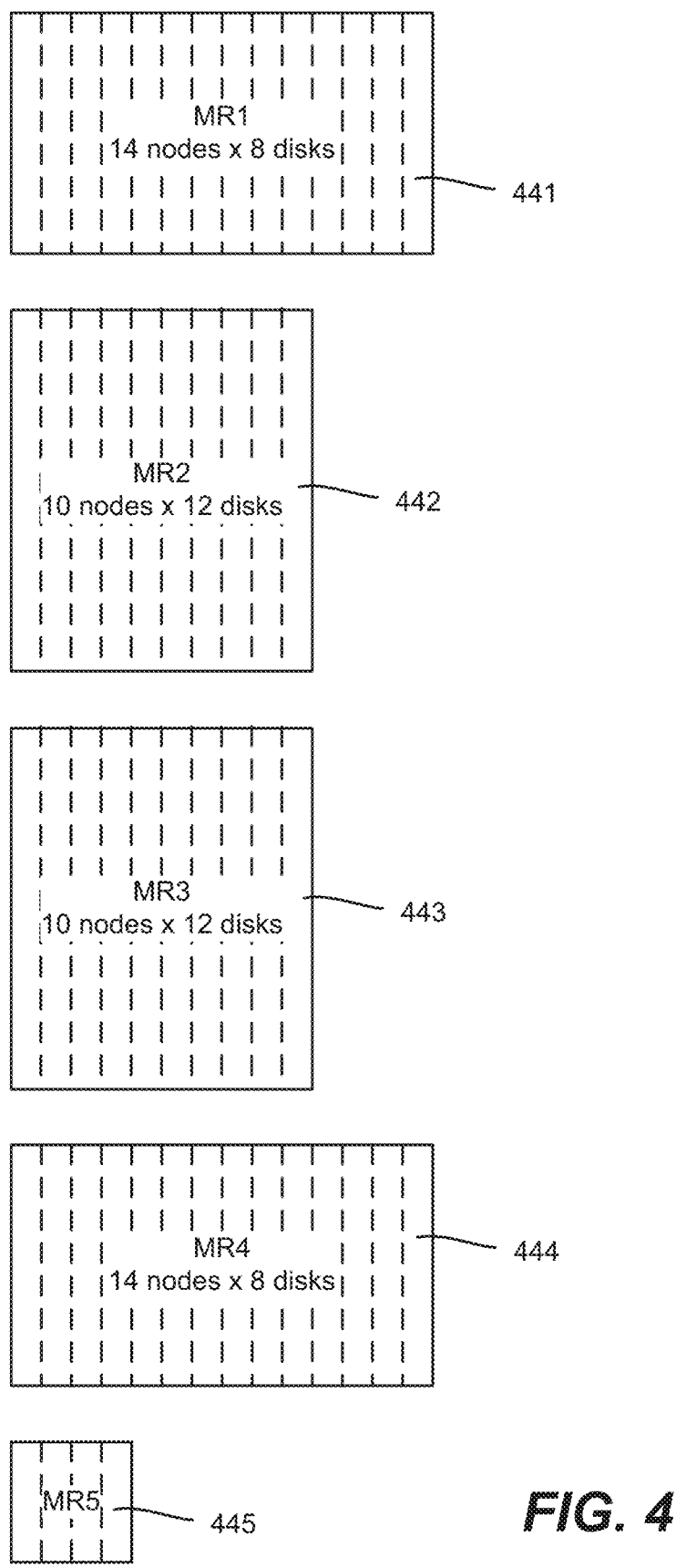
FIG. 4 is an example block diagram representation of mapped clusters being divided into columns for performant mapping to real nodes and corresponding disks, in accordance with various aspects and implementations of the subject disclosure.

By way of a more particular example, in FIG. 3, there is shown a logical rectangle 330 that represents the dimensions of a real RAIN of 24 nodes (horizontal), in which each node manages 20 disks (vertical), as in FIG. 2, that is, the size of the real RAIN is 24×20 (nodes×disks). In the example of FIG. 3, the real RAIN needs to run 5 mapped RAINs of differing dimensions, namely MR1: 14×8; MR2: 10×12; MR3: 10×12; MR4: 14×8 and MR5: 4×4. As described herein, it is desired that each mapped node of the mapped RAINs manages a set of disks from one real node. For instance, the first node of MR2 can be mapped so as to manage the first twelve disks of the first real node. Accordingly, storage services of each mapped node run on a real node, which has the disks allocated for the mapped node. For instance, the first real node can run the storage services of the first mapped nodes of MR2 and MR4. As can be readily appreciated, the problem is to pack these mapped nodes into the real RAIN's logical rectangle space in a way that meets the desired performance-related characteristics (each mapped node of the mapped RAINs manages a set of disks from one real node) described herein.

To meet these desired characteristics and thereby provide high performance, the technology described herein, as implemented in part in the performance allocation logic 114, divides the mapped RAINs into logical columns of nodes. In one or more implementations, the dividing results in a single column/mapped node widths of one; packing with the column width of one helps to avoid unused space in different parts of the rectangle of the real RAIN; (although it can be appreciated that a wider column can be used, e.g., since the widths of the mapped RAINs have a least common denominator of two, the width of the columns can be two, etc.).

Figure 5:
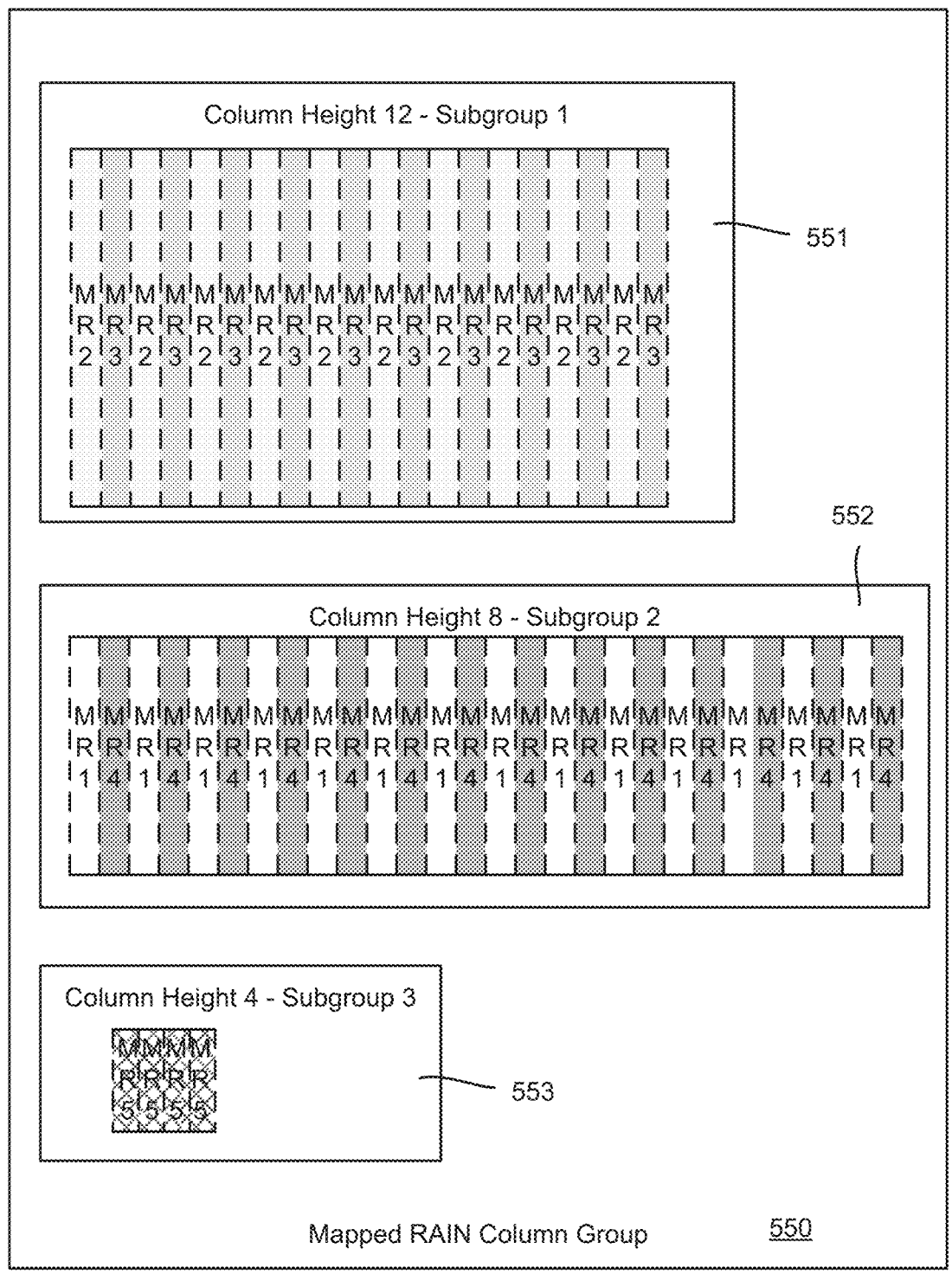
FIG. 5 is an example block diagram representation of subgroups of columns of mapped clusters based on height within a column group, in accordance with various aspects and implementations of the subject disclosure.

Once the logical columns are obtained, as shown in FIG. 5, the logical columns are grouped together into a group 550. Note that these columns can be represented as mapped node identifiers in memory, for example, and associated with height information corresponding to their respective number of disks. Indeed, FIG. 5 shows the logical columns grouped into logical subgroups 551-553 by height, which can be accomplished by height-information based sorting, for example. In actuality subgroups are not needed, but are shown herein for purposes of explanation; (notwithstanding, if used, subgroup membership can be used as the height information, e.g., a column in a first subgroup has greater height than a column in a next subgroup and so on). Note that for purposes of illustration, the columns of two different mapped RAINs in a subgroup (MR2 and MR3 in subgroup 551 and MR1 and MR4 in subgroup 552) are shown as alternating, although as is understood the subgroups need not alternate in this way.

Figure 6:
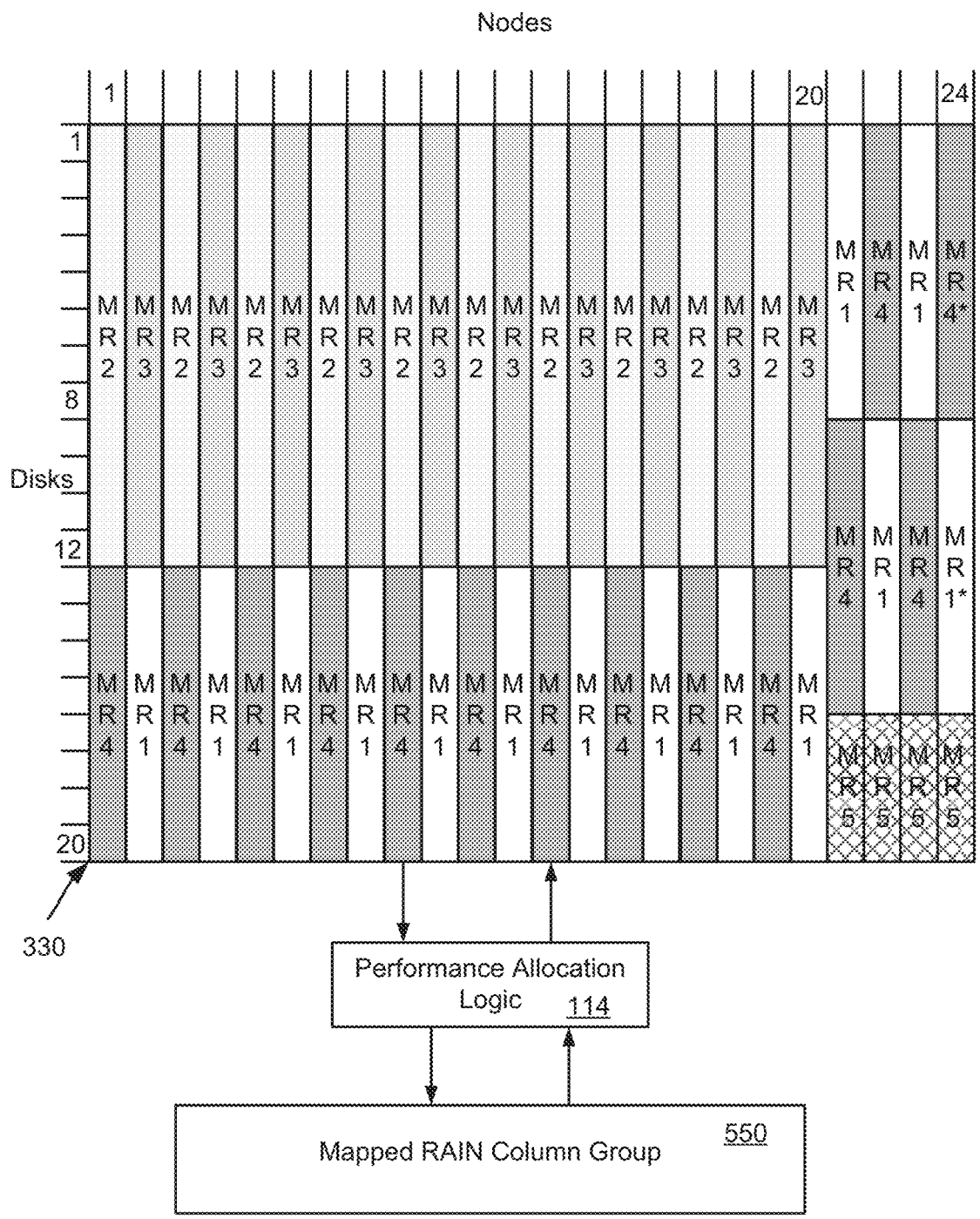
FIG. 6 is an example block diagram representation of columns of mapped clusters being positioned in a logical rectangle that represents a real cluster, in accordance with various aspects and implementations of the subject disclosure
Figure 7A:
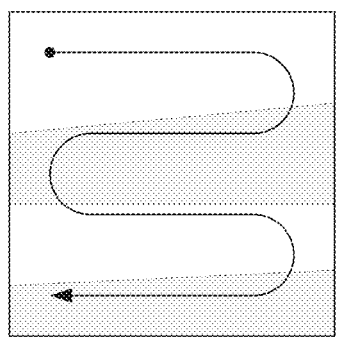
FIGS. 7A-7D are representations of example positioning patterns for placing columns of mapped clusters into a logical rectangle that represents a real cluster, in accordance with various aspects and implementations of the subject disclosure.

As represented in FIG. 6, once the group 550 of logical columns are obtained and associated with height information, the performance allocation logic 114 then logically places (positions) the logical columns into a space in the logical rectangle 330. To this end, a consistent placement pattern is used, which, for example, can be a one direction vertical (top-down), back-and-forth horizontal positioning pattern starting horizontally from the leftmost space, with columns selected based on greatest height first, as generally represented in FIG. 7A. Note that the resulting layout of the mapped RAINs provides high performance because the above-described requirements for a high performance configuration are met.

Figure 7B:
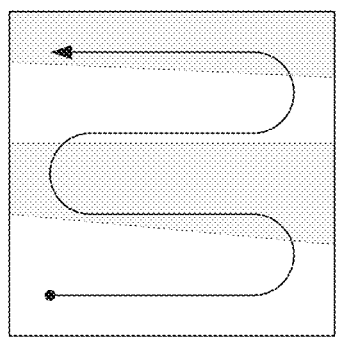
Figure 7C:
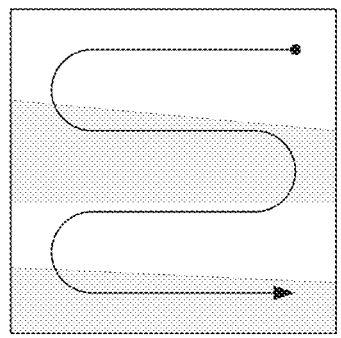
Figure 7D:
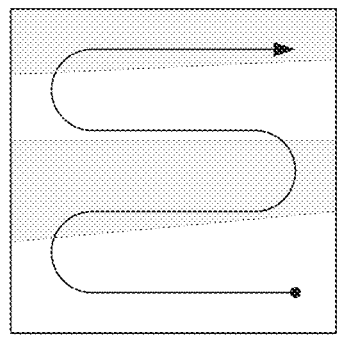

Note however that this is only one convenient way to select spaces for logically positioning the columns, and other ways are possible. For example, FIG. 7B shows a bottom-up vertical, back-and-forth placement pattern starting from the left; FIG. 7C shows a top-down vertical, back-and-forth horizontal positioning pattern starting from the right, and FIG. 7D shows a bottom-up vertical, back-and-forth horizontal positioning pattern starting from the right.

Note further that as used herein, in one orientation, nodes are horizontally arranged and disks are vertically arranged, whereby a column of horizontal width one representing a single mapped node has a vertical height corresponding to a number of disks. As can be readily appreciated, it is basically identical to have another orientation that is rotated ninety degrees so as to represent nodes as vertically arranged and disks as horizontally arranged. Thus the terms "width" and "height" along with "vertical" and "horizontal" and "column" as used herein are understood to be relative to an orientation, e.g., the orientation exemplified in the figures, which can be rotated without changing the general relative meanings of these terms.

Figure 8:
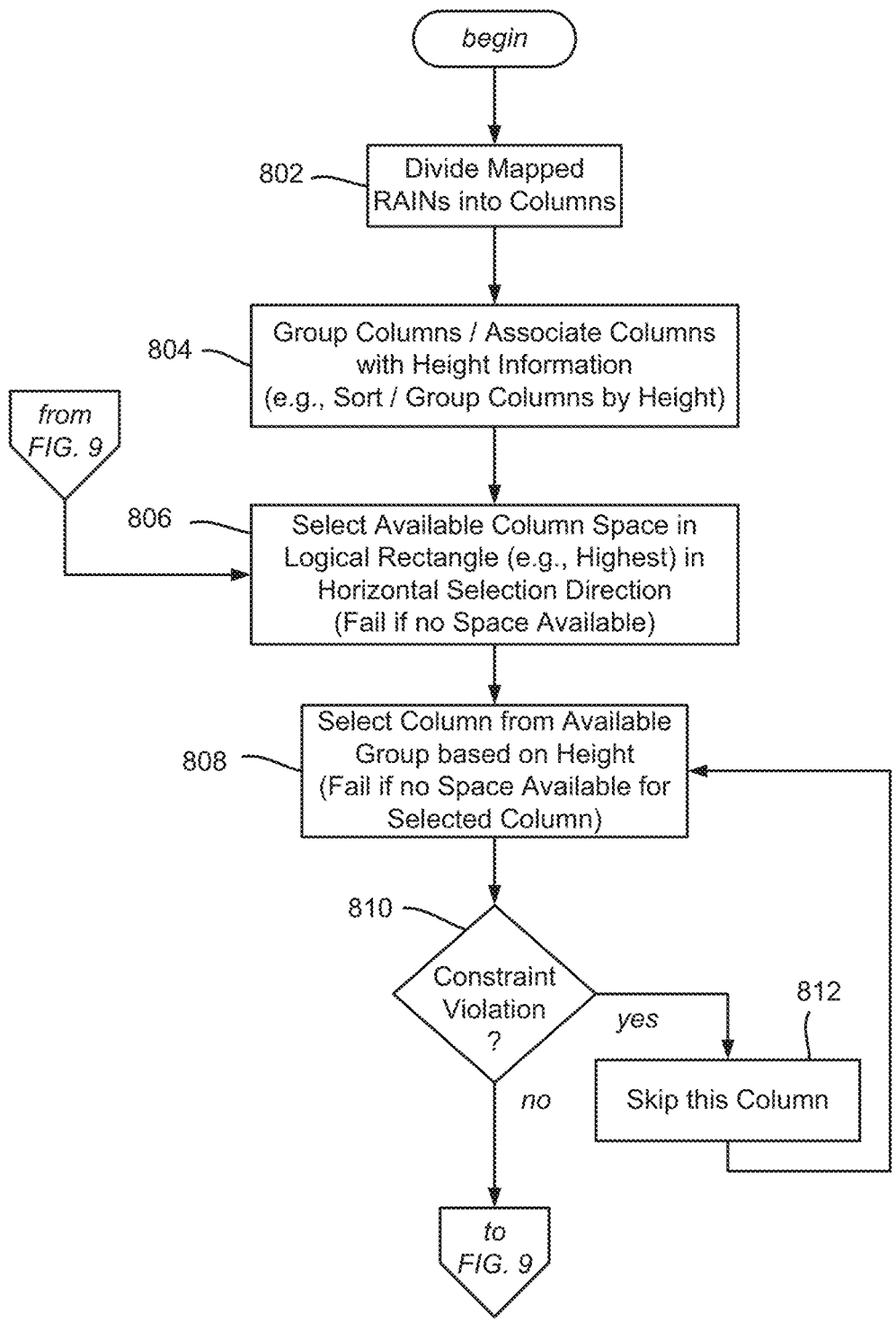
FIGS. 8 and 9 comprise a flow diagram showing example operations for positioning mapped clusters in a logical rectangle that represents a real cluster, in accordance with various aspects and implementations of the subject disclosure.
Figure 9:
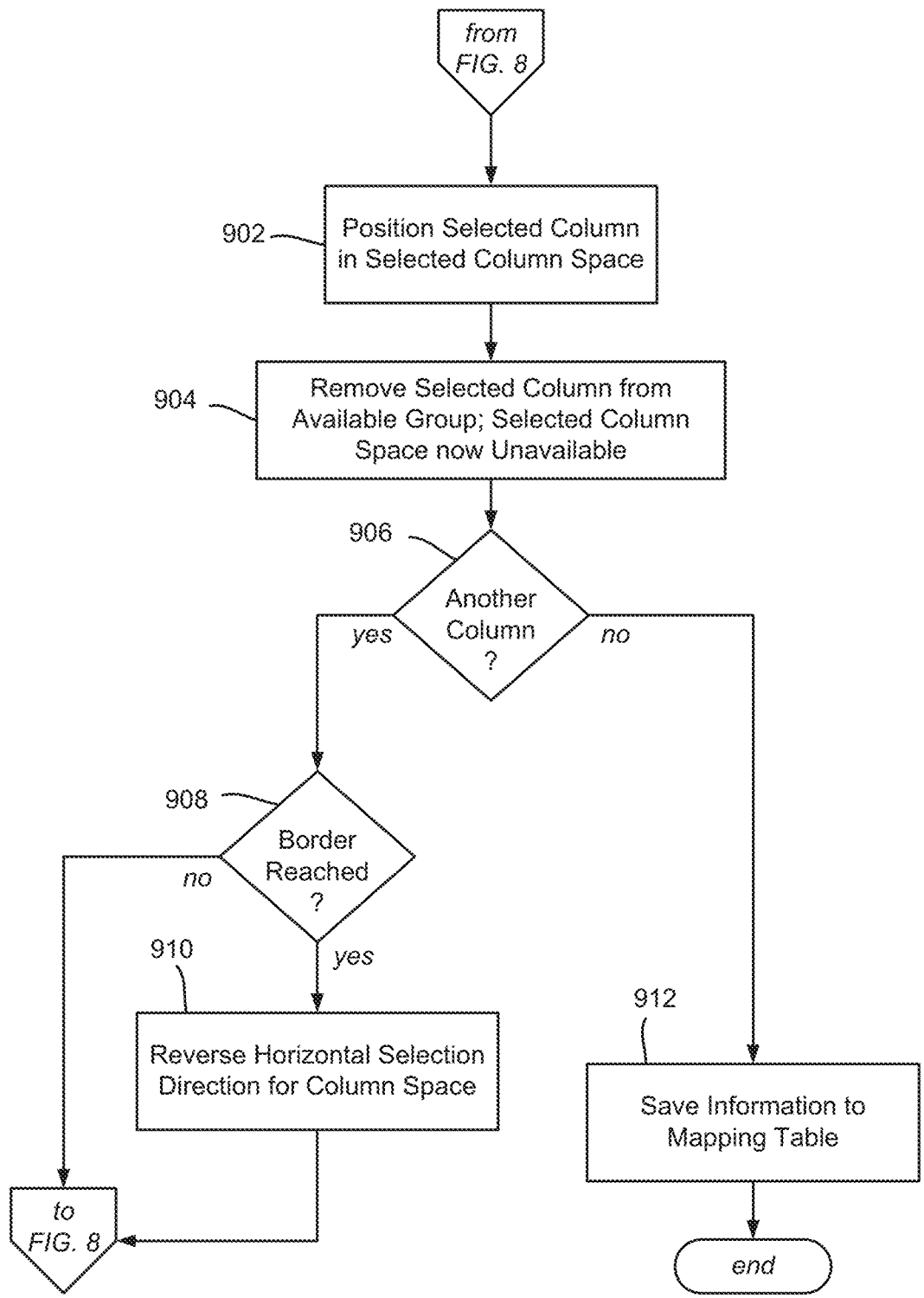

FIGS. 8 and 9 show example operations that can be performed by the performance allocation logic 114, beginning at operation 802 which represents dividing the mapped RAINs into the columns as described herein. Operation 804 represents grouping/associating the columns (each column corresponding to a mapped node) with height information, which can include sorting the columns by height, e.g., from greatest height to least height.

Operation 806 represents selecting a column space in the vertical rectangle. For example, using the positioning pattern of FIG. 7A, the first column space selected is the topmost, leftmost space.

Operation 808 represents selecting the column from the group of available columns to place, which in this example is based on greatest height (e.g., initially from the logical subgroup 551, FIG. 5 of mapped columns for MR2 or MR3 of height twelve) of those remaining available for placement.

Operation 810 checks for whether the selected column will violate the constraint that two disks managed by one real node are not to go to different mapped nodes of one mapped RAIN. This can be rephrased using column-based terminology as no two columns that belong to one mapped RAIN can be mapped to one real node. If the constraint is violated, operation 812 skips this column (note that the skipped column will be selected and evaluated again in a subsequent iteration). When a column that does not violate the constraint is selected, the example operations continue in FIG. 9.

Operation 902 of FIG. 9 represents positioning (logically placing) the selected column in the selected space. Operation 904 removes the selected column from the group of those available, which can be by deletion of the column identifier from working memory, flagging of the column identifier in working memory as having been placed, and so on. Operation 904 similarly makes the selected column space unavailable for further placement of a column. Operation 906 continues the process until no columns remain.

As shown in FIG. 6, at some point when positioning columns in spaces selected from left-to-right, the logical rectangle's right border is reached, corresponding to the column MR4 with the asterisk (MR4*) having been positioned in the logical rectangle 330. Operation 908 of FIG. 9 detects when this situation occurs, and branches to operation 910 which reverses the horizontal column selection direction to the opposite direction. In FIGS. 6 and 7A, this means that selecting space in the left-to-right direction is done for now, and selection of space will be from right-to-left until the left border is reached. The process returns to operation 806 of FIG. 8 to select the next space.

In this example, the next space is the highest space available moving from right to left, which in FIG. 6 corresponds to the space in which the column MR1 with the asterisk (MR1*) is logically placed therein. Note that the constraint evaluation at operation 810 is significant at this time, as otherwise it is feasible that when going in the opposite direction, two columns that belong to one mapped RAIN can be otherwise mapped to one real node (e.g., a different MR4 column if not alternating with MR1 columns as in FIG. 5 could otherwise be selected and placed).

As can be seen by following the example logic/operations of FIGS. 8 and 9 in conjunction with the example in FIG. 6, the remaining MR4 and MR1 columns are placed in spaces selected in a top-down, right to left manner. In this example the columns of height eight are all placed when the left border is reached, but this does not necessarily occur. In any event, the remaining spaces are selected, this time top-down, from left to right, for the columns of mapped RAIN MR5.

It should be noted that failure handling can be integrated into the operations in a straightforward manner. For example, as part of operation 806, the allocation mapping can be failed if there is no space available for another column. Operation 808 can also ensure that the selected column fits the selected space, and fail if no such space can be found.

When the last MR5 column is placed in the logical rectangle (e.g., an array in memory), operation 906 branches to operation 912 which saves the information in the logical rectangle into an appropriate format for the mapping table.

Resource allocation is successful when the columns of mapped RAINs are placed within the enclosing rectangle of the real RAIN. At this time, the mapped RAINs can be used for data I/O, with high performance resulting from the strategic allocation and mapping as described herein.

Figure 10:
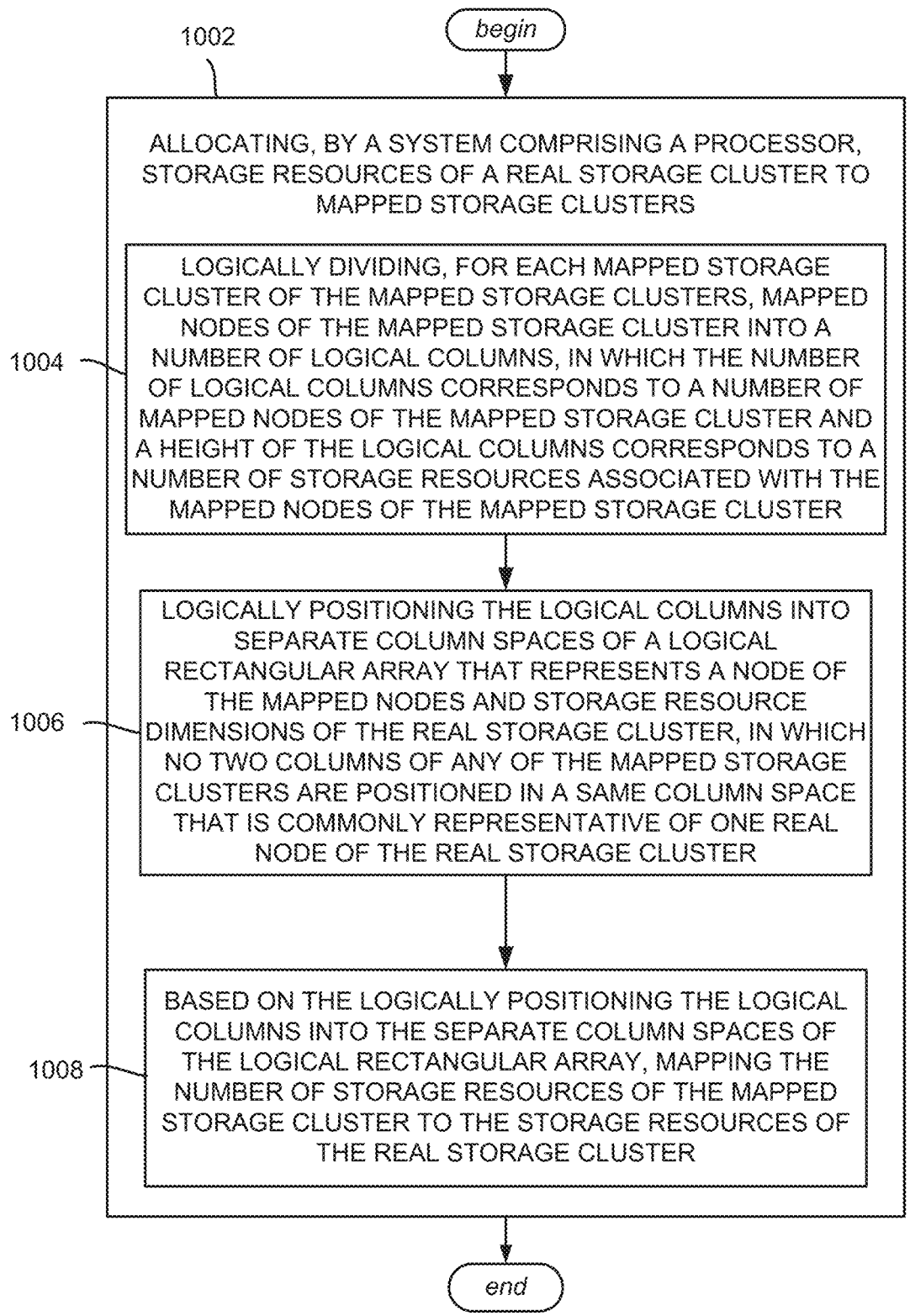
FIG. 10 is a flow diagram showing example operations for allocating storage resources of a real cluster using columns of mapped nodes, in accordance with various aspects and implementations of the subject disclosure.

One or more aspects of the technology described herein are represented as example operations in FIG. 10, which comprises allocating, by a system comprising a processor, storage resources of a real storage cluster to mapped storage clusters (operation 1002). The allocating, represented by operation 1004, 1006 and 1008, can comprise logically dividing, for each mapped storage cluster of the mapped storage clusters, mapped nodes of the mapped storage cluster into a number of logical columns, in which the number of logical columns corresponds to a number of mapped nodes of the mapped storage cluster and a height of the logical columns corresponds to a number of storage resources associated with the mapped nodes of the mapped storage cluster (operation 1004). Operation 1006 represents logically positioning the logical columns into separate column spaces of a logical rectangular array that represents a node of the mapped nodes and storage resource dimensions of the real storage cluster, in which no two columns of any of the mapped storage clusters are positioned in a same column space that is commonly representative of one real node of the real storage cluster. Operation 1008 represents, based on the logically positioning the logical columns into the separate column spaces of the logical rectangular array, mapping the number of storage resources of the mapped storage cluster to the storage resources of the real storage cluster.

Logically dividing, for the mapped storage cluster, can comprise dividing the mapped nodes of the mapped storage cluster into one column of the number of logical columns per each mapped node of the mapped nodes of the mapped storage cluster.

Logically positioning the logical columns into the separate column spaces can comprise sorting the logical columns based on the height of each column of the number of logical columns into a height-ordered logical column group, and selecting the logical columns for the positioning based on ordering in the height-ordered logical column group. Logically positioning the logical columns into the separate column spaces can comprise selecting the logical columns for the positioning from greatest-height columns to lowest-height columns.

Logically positioning the logical columns into the separate column spaces can comprise positioning each column of the number of logical columns in a separate column space in a horizontal back-and forth pattern. Logically positioning the logical columns into the separate column spaces can comprise positioning each column of the number of logical columns in a separate column space in a top down, horizontal back-and forth pattern.

Logically positioning the logical columns into the separate column spaces can comprise determining a highest available column space within the logical rectangular array based on a back-and forth positioning pattern, selecting as a selected column of the number of logical columns, a greatest height column that remains to be positioned in a rectangle of the logical rectangular array and is not a second column of a mapped redundant array of independent nodes that has a first column positioned in a separate column space above the highest available column space, and placing the selected column in the highest available column space.

Aspects can comprise facilitating a data operation that references a mapped storage resource of the mapped storage cluster to occur in a storage resource of the storage resources of the real storage cluster based on the mapping the number of storage resources of the mapped storage clusters to the storage resources of the real storage cluster.

Figure 11:
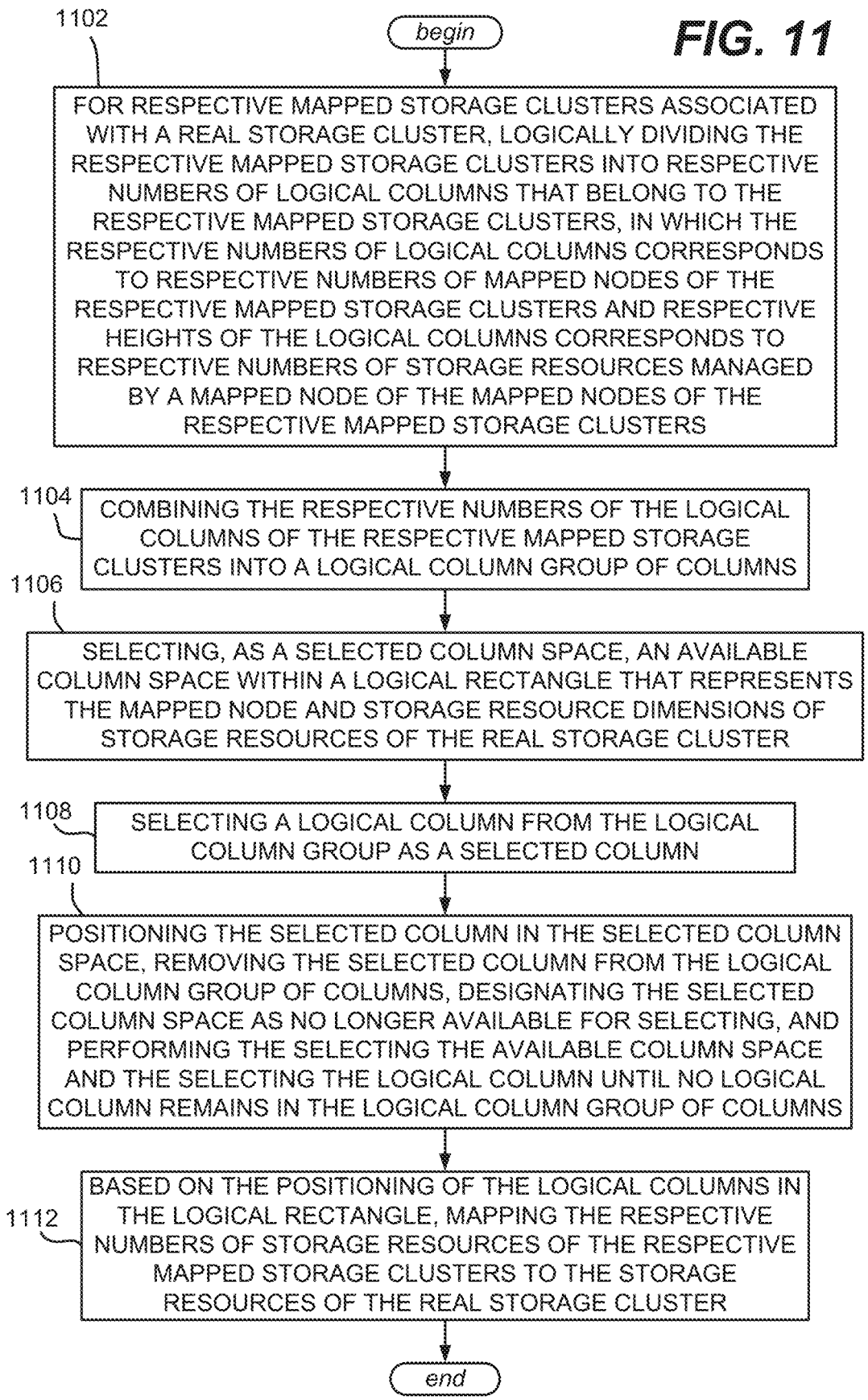
FIG. 11 is a flow diagram showing example operations for positioning columns of mapped nodes in a logical rectangle that represents a real cluster, in accordance with various aspects and implementations of the subject disclosure.

One or more aspects are represented in FIG. 11, such as embodied in a system, comprising a processor and a memory that stores executable instructions that, when executed by the processor, facilitate performance of operations. Example operations can comprise operation 1102, which represents for respective mapped storage clusters associated with a real storage cluster, logically dividing the respective mapped storage clusters into respective numbers of logical columns that belong to the respective mapped storage clusters, in which the respective numbers of logical columns corresponds to respective numbers of mapped nodes of the respective mapped storage clusters and respective heights of the logical columns corresponds to respective numbers of storage resources managed by a mapped node of the mapped nodes of the respective mapped storage clusters. Operation 1104 represents combining the respective numbers of the logical columns of the respective mapped storage clusters into a logical column group of columns. Operation 1106 represents selecting, as a selected column space, an available column space within a logical rectangle that represents the mapped node and storage resource dimensions of storage resources of the real storage cluster. Operation 1108 represents selecting a logical column from the logical column group as a selected column. Operation 1110 represents positioning the selected column in the selected column space, removing the selected column from the logical column group of columns, designating the selected column space as no longer available for selecting, and performing the selecting the available column space and the selecting the logical column until no logical column remains in the logical column group of columns. Operation 1112 represents, based on the positioning of the logical columns in the logical rectangle, mapping the respective numbers of storage resources of the respective mapped storage clusters to the storage resources of the real storage cluster.

Combining the respective numbers of the logical columns of the respective mapped storage clusters into the logical column group of columns can comprise sorting the respective numbers of the logical columns based on height into the logical column group of columns.

The respective numbers of the logical columns of the group can be associated with height information, and selecting the logical column from the logical column group of columns as the selected column can comprise selecting, as the selected column, the logical column based on the height information.

The mapped nodes can be horizontally represented in the logical rectangle and the respective numbers of the logical columns can be vertically represented within the logical rectangle, and selecting the logical column from the logical column group of columns as the selected column can comprise skipping over an available logical column in the logical column group of columns in response to determining that the available logical column belongs to a first mapped storage cluster and determining that the selected column space is vertically aligned with a previously selected column space in which a previously selected column that belongs to the first mapped storage cluster is positioned.

Aspects can comprise facilitating, by the system, a data operation that references a mapped storage resource of the respective mapped storage clusters to occur in a storage resource of the storage resources of the real storage cluster based on the mapping the respective numbers of storage resources of the respective mapped storage clusters to the storage resources of the real storage cluster.

Selecting, as the selected column space, the available column space can comprise determining the available column space using a back-and-forth horizontal, and one-directional vertical, selection pattern. Selecting, as the selected column space, the available column space within the logical rectangle can comprise selecting, in a left-to-right selection pattern, a highest and leftmost column space that is available until a rightmost boundary of the logical rectangle is reached, and then selecting, in a right-to-left selection pattern, a highest and rightmost column space that is available until a leftmost boundary of the logical rectangle is reached.

The columns of the logical column group can be associated with height information, and the selecting the logical column from the logical column group as the selected column can comprise selecting, as the selected column, the logical column having a greatest height based on the height information; selecting, as the selected column space, the available column space within the logical rectangle can comprise determining, in a left-to-right selection pattern, a highest and leftmost column space that is available until a rightmost boundary of the logical rectangle is reached, and then determining, in a right-to-left selection pattern, a highest and rightmost column space that is available until a leftmost boundary of the logical rectangle is reached.

Figure 12:
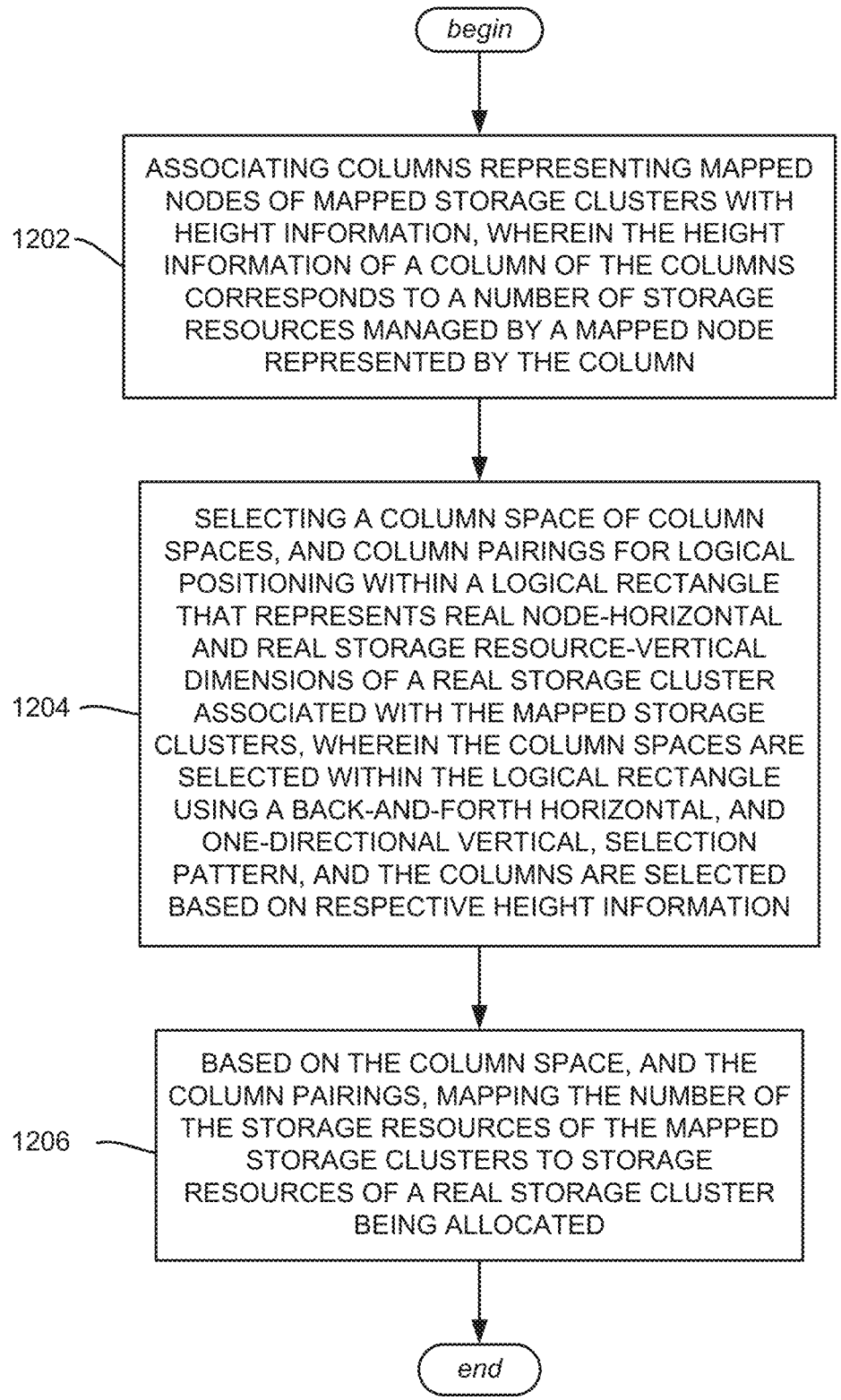
FIG. 12 is a flow diagram showing example operations for selecting mapped columns based on height for positioning the columns in a back-and-forth horizontal pattern in a logical rectangle that represents a real cluster, in accordance with various aspects and implementations of the subject disclosure.

One or more aspects are represented as example operations in FIG. 12, and for example, can correspond a machine-readable storage medium, comprising executable instructions that, when executed by a processor, facilitate performance of the operations. Operation 1202 represents associating columns representing mapped nodes of mapped storage clusters with height information, wherein the height information of a column of the columns corresponds to a number of storage resources managed by a mapped node represented by the column. Operation 1204 represents selecting a column space of column spaces, and column pairings for logical positioning within a logical rectangle that represents real node-horizontal and real storage resource-vertical dimensions of a real storage cluster associated with the mapped storage clusters, wherein the column spaces are selected within the logical rectangle using a back-and-forth horizontal, and one-directional vertical, selection pattern, and the columns are selected based on respective height information. Operation 1206 represents based on the column space, and the column pairings, mapping the number of the storage resources of the mapped storage clusters to storage resources of a real storage cluster being allocated.

Selecting the column space, and the column pairings can comprise evaluating whether a first candidate column for the column space, and a column pairing of the column pairings violates a constraint that avoids having two columns of a common mapped storage cluster mapped to a real node of the real storage cluster. In response to the constraint being determined not to have been violated by the column space and the column pairing, aspects can comprise forming a first candidate column pairing, and using the first candidate column for the column space, and the given column pairing. In response to the constraint being determined to have been violated by the column space and the column pairing, aspects can comprise forming the first candidate column pairing, locating a second candidate column that does not violate the constraint, and using the second candidate column for the column space, and the column pairing.

Selecting the column space, and the column pairings using the back-and-forth horizontal and the one-directional vertical selection pattern can comprise locating, for a selected column, the column space that is not previously paired with a column, using a left-to-right horizontal, one-directional vertical selection pattern until a rightmost boundary is reached, and then using a right-to-left horizontal, one-directional vertical selection pattern until a leftmost boundary is reached.

Selecting the column space, and the column pairings can comprise selecting a first column that is not previously selected based on first height information associated with the first column that indicates the first column has a greater height than a second column based on second height information associated with the second column.

As can be seen, the technology described herein provides for packing columns representing mapped nodes into a logical rectangle with dimensions of a real cluster, which corresponds to mapping mapped clusters to real cluster resources. Instead of complex packing analysis, packing is relatively straightforward because the mapped clusters are divided into columns. With columns, resource allocation corresponds to placement in a logical rectangle being performed for N' columns. Note that packing the columns is straightforward, because the columns are almost independent, except for the constraint that no two columns that belong to one mapped RAIN can be mapped to one real node.

Figure 13:
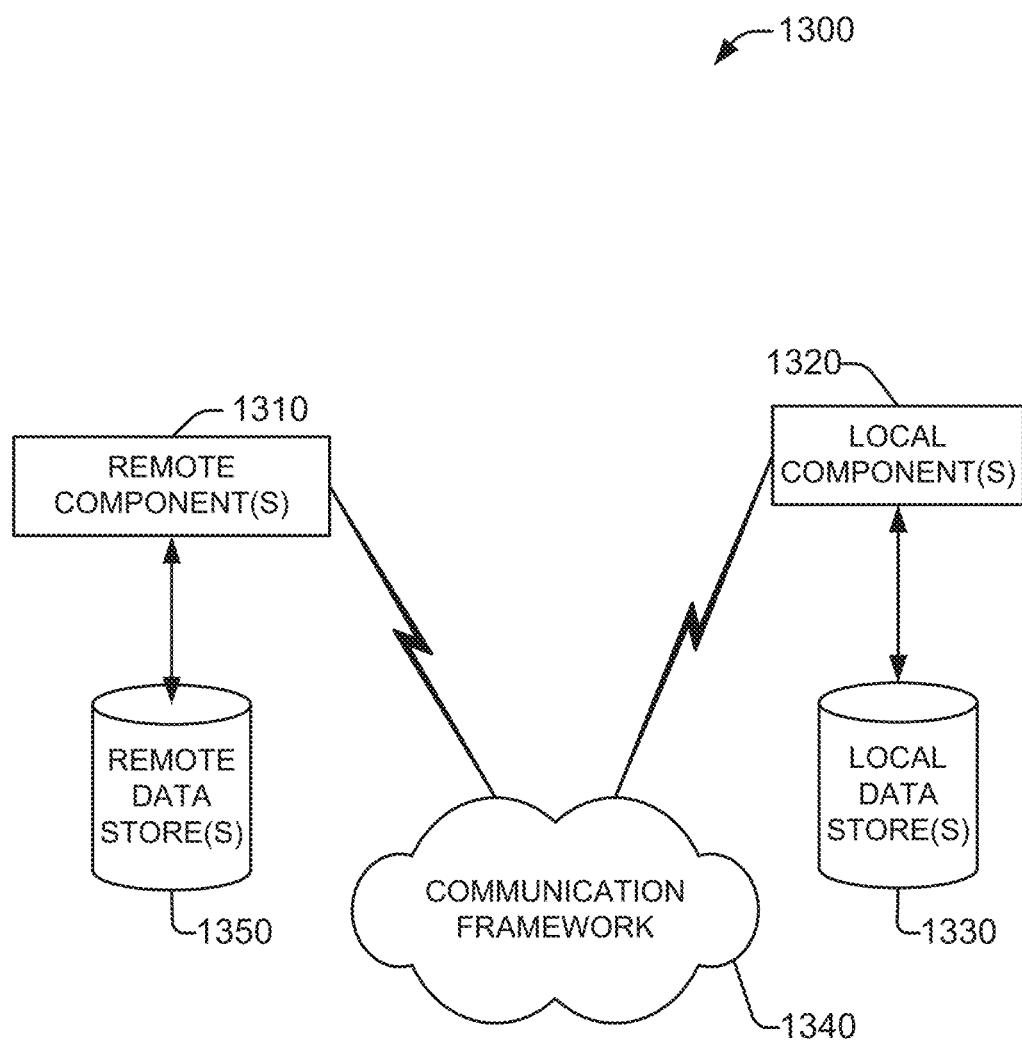
FIG. 13 depicts an example schematic block diagram of a computing environment with which the disclosed subject matter can interact.

FIG. 13 is a schematic block diagram of a computing environment 1300 with which the disclosed subject matter can interact. The system 1300 comprises one or more remote component(s) 1310. The remote component(s) 1310 can be hardware and/or software (e.g., threads, processes, computing devices). In some embodiments, remote component(s) 1310 can be a distributed computer system, connected to a local automatic scaling component and/or programs that use the resources of a distributed computer system, via communication framework 1340. Communication framework 1340 can comprise wired network devices, wireless network devices, mobile devices, wearable devices, radio access network devices, gateway devices, femtocell devices, servers, etc.

The system 1300 also comprises one or more local component(s) 1320. The local component(s) 1320 can be hardware and/or software (e.g., threads, processes, computing devices). In some embodiments, local component(s) 1320 can comprise an automatic scaling component and/or programs that communicate/use the remote resources 1310 and 1320, etc., connected to a remotely located distributed computing system via communication framework 1340.

One possible communication between a remote component(s) 1310 and a local component(s) 1320 can be in the form of a data packet adapted to be transmitted between two or more computer processes. Another possible communication between a remote component(s) 1310 and a local component(s) 1320 can be in the form of circuit-switched data adapted to be transmitted between two or more computer processes in radio time slots. The system 1300 comprises a communication framework 1340 that can be employed to facilitate communications between the remote component(s) 1310 and the local component(s) 1320, and can comprise an air interface, e.g., Uu interface of a UMTS network, via a long-term evolution (LTE) network, etc. Remote component(s) 1310 can be operably connected to one or more remote data store(s) 1350, such as a hard drive, solid state drive, SIM card, device memory, etc., that can be employed to store information on the remote component(s)

1310 side of communication framework 1340. Similarly, local component(s) 1320 can be operably connected to one or more local data store(s) 1330, that can be employed to store information on the local component(s) 1320 side of communication framework 1340.

Figure 14:
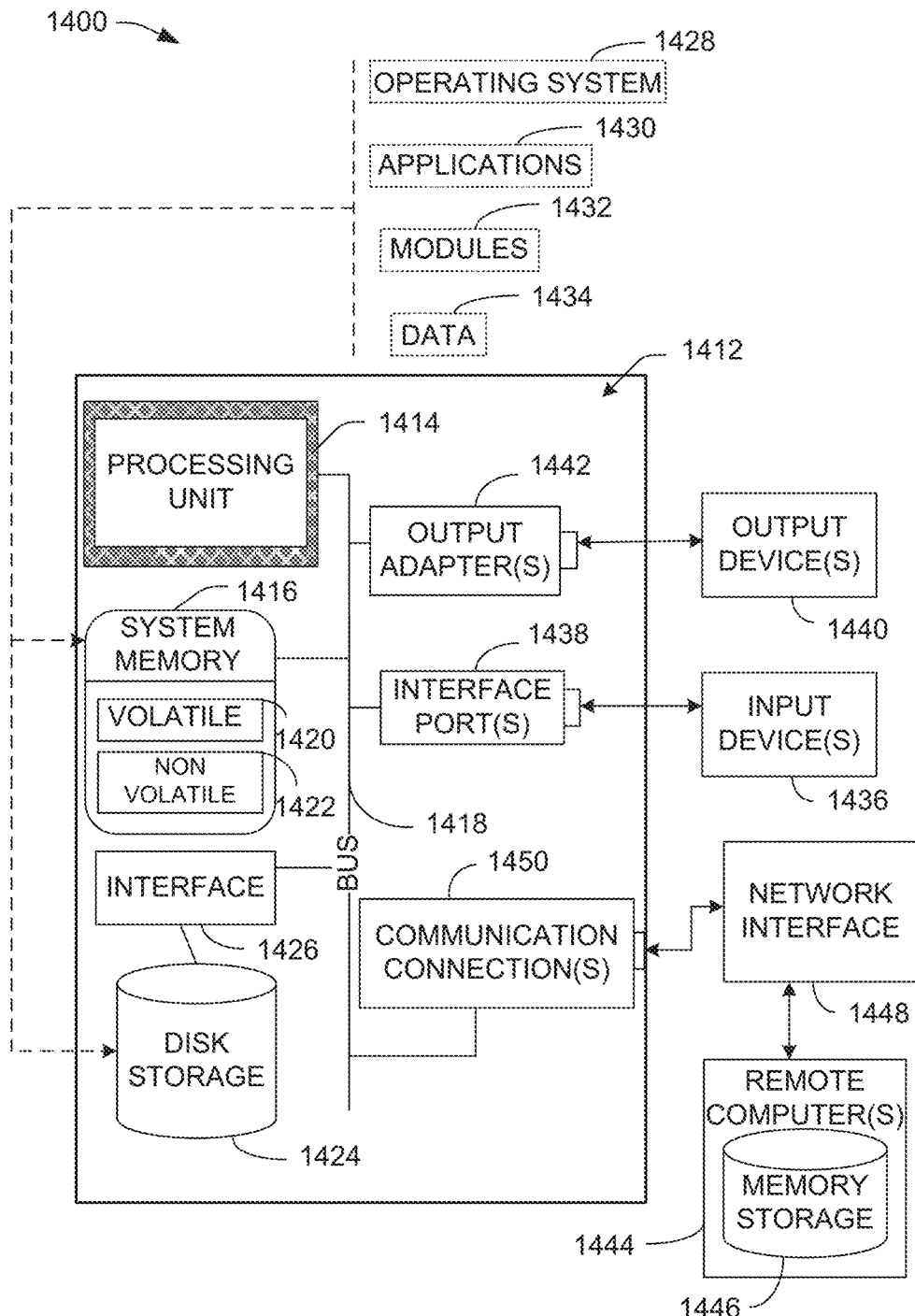
FIG. 14 illustrates an example block diagram of a computing system operable to execute the disclosed systems and methods in accordance with various aspects and implementations of the subject disclosure.

In order to provide a context for the various aspects of the disclosed subject matter, FIG. 14, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1420 (see below), nonvolatile memory 1422 (see below), disk storage 1424 (see below), and memory storage 1446 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 14 illustrates a block diagram of a computing system 1400 operable to execute the disclosed systems and methods in accordance with one or more embodiments/implementations described herein. Computer 1412, can comprise a processing unit 1414, a system memory 1416, and a system bus 1418. System bus 1418 couples system components comprising, but not limited to, system memory 1416 to processing unit 1414. Processing unit 1414 can be any of various available processors. Dual microprocessors and other multiprocessor architectures also can be employed as processing unit 1414.

System bus 1418 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1394), and small computer systems interface.

System memory 1416 can comprise volatile memory 1420 and nonvolatile memory 1422. A basic input/output system, containing routines to transfer information between elements within computer 1412, such as during start-up, can be stored in nonvolatile memory 1422. By way of illustration, and not limitation, nonvolatile memory 1422 can comprise read only memory, programmable read only memory, electrically programmable read only memory, electrically erasable read only memory, or flash memory. Volatile memory 1420 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1412 can also comprise removable/non-removable, volatile/non-volatile computer storage media. FIG. 14 illustrates, for example, disk storage 1424. Disk storage 1424 comprises, but is not limited to, devices like a magnetic disk drive, floppy disk drive, tape drive, flash memory card, or memory stick. In addition, disk storage 1424 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1424 to system bus 1418, a removable or non-removable interface is typically used, such as interface 1426.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising determining a mapped cluster schema, altering the mapped cluster schema until a rule is satisfied, allocating storage space according to the mapped cluster schema, and enabling a data operation corresponding to the allocated storage space, as disclosed herein.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 14 describes software that acts as an intermediary between users and computer resources described in suitable operating environment 1400. Such software comprises an operating system 1428. Operating system 1428, which can be stored on disk storage 1424, acts to control and allocate resources of computer system 1412. System applications 1430 take advantage of the management of resources by operating system 1428 through program modules 1432 and program data 1434 stored either in system memory 1416 or on disk storage 1424. It is to be noted that the disclosed subject matter can be implemented with various operating systems or combinations of operating systems.

A user can enter commands or information into computer 1412 through input device(s) 1436. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1412. Input devices 1436 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1414 through system bus 1418 by way of interface port(s) 1438. Interface port(s) 1438 comprise, for example, a serial port, a parallel port, a game port, a universal serial bus, an infrared port, a Bluetooth port, an IP port, or a logical port associated with a wireless service, etc. Output device(s) 1440 use some of the same type of ports as input device(s) 1436.

Thus, for example, a universal serial busport can be used to provide input to computer 1412 and to output information from computer 1412 to an output device 1440. Output adapter 1442 is provided to illustrate that there are some output devices 1440 like monitors, speakers, and printers, among other output devices 1440, which use special adapters. Output adapters 1442 comprise, by way of illustration and not limitation, video and sound cards that provide means of connection between output device 1440 and system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. Remote computer(s) 1444 can be a personal computer, a server, a router, a network PC, cloud storage, a cloud service, code executing in a cloud computing environment, a workstation, a microprocessor-based appliance, a peer device, or other common network node and the like, and typically comprises many or all of the elements described relative to computer 1412. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1446 is illustrated with remote computer(s) 1444. Remote computer(s) 1444 is logically connected to computer 1412 through a network interface 1448 and then physically connected by way of communication connection 1450. Network interface 1448 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1450 refer(s) to hardware/software employed to connect network interface 1448 to bus 1418. While communication connection 1450 is shown for illustrative clarity inside computer 1412, it can also be external to computer 1412. The hardware/software for connection to network interface 1448 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A method, comprising:
    allocating, by a system comprising a processor, storage resources of a real storage cluster to mapped storage clusters, the allocating comprising:
        logically dividing, for each mapped storage cluster of the mapped storage clusters, mapped nodes of the mapped storage cluster into a number of logical columns, in which the number of logical columns corresponds to a number of mapped nodes of the mapped storage cluster and a height of the logical columns corresponds to a number of storage resources associated with the mapped nodes of the mapped storage cluster;
        logically positioning the logical columns into separate column spaces of a logical rectangular array that represents a node of the mapped nodes and storage resource dimensions of the real storage cluster, in which no two columns of any of the mapped storage clusters are positioned in a same column space that is commonly representative of one real node of the real storage cluster; and
        based on the logically positioning the logical columns into the separate column spaces of the logical rectangular array, mapping the number of storage resources of the mapped storage cluster to the storage resources of the real storage cluster.

2. The method of claim 1, wherein the logically dividing, for the mapped storage cluster, comprises dividing the mapped nodes of the mapped storage cluster into one column of the number of logical columns per each mapped node of the mapped nodes of the mapped storage cluster.

3. The method of claim 1, wherein the logically positioning the logical columns into the separate column spaces comprises sorting the logical columns based on the height of each column of the number of logical columns into a height-ordered logical column group, and selecting the logical columns for the positioning based on ordering in the height-ordered logical column group.

4. The method of claim 1, wherein the logically positioning the logical columns into the separate column spaces comprises selecting the logical columns for the positioning from greatest-height columns to lowest-height columns.

5. The method of claim 1, wherein the logically positioning the logical columns into the separate column spaces comprises positioning each column of the number of logical columns in a separate column space in a horizontal back-and forth pattern.

6. The method of claim 1, wherein the logically positioning the logical columns into the separate column spaces comprises positioning each column of the number of logical columns in a separate column space in a top down, horizontal back-and forth pattern.

7. The method of claim 1, wherein the logically positioning the logical columns into the separate column spaces comprises determining a highest available column space within the logical rectangular array based on a back-and forth positioning pattern, selecting as a selected column of the number of logical columns, a greatest height column that remains to be positioned in a rectangle of the logical rectangular array and is not a second column of a mapped redundant array of independent nodes that has a first column positioned in a separate column space above the highest available column space, and placing the selected column in the highest available column space.

8. The method of claim 1, further comprising, facilitating, by the system, a data operation that references a mapped storage resource of the mapped storage cluster to occur in a storage resource of the storage resources of the real storage cluster based on the mapping the number of storage resources of the mapped storage clusters to the storage resources of the real storage cluster.

9. A system, comprising:
a processor; and
a memory that stores executable instructions that, when executed by the processor, facilitate performance of operations, the operations comprising:
for respective mapped storage clusters associated with a real storage cluster, logically dividing the respective mapped storage clusters into respective numbers of logical columns that belong to the respective mapped storage clusters, in which the respective numbers of logical columns corresponds to respective numbers of mapped nodes of the respective mapped storage clusters and respective heights of the logical columns corresponds to respective numbers of storage resources managed by a mapped node of the mapped nodes of the respective mapped storage clusters;
combining the respective numbers of the logical columns of the respective mapped storage clusters into a logical column group of columns;
selecting, as a selected column space, an available column space within a logical rectangle that represents the mapped node and storage resource dimensions of storage resources of the real storage cluster;
selecting a logical column from the logical column group as a selected column;
positioning the selected column in the selected column space, removing the selected column from the logical column group of columns, designating the selected column space as no longer available for selecting, and performing the selecting the available column space and the selecting the logical column until no logical column remains in the logical column group of columns; and
based on the positioning of the logical columns in the logical rectangle, mapping the respective numbers of storage resources of the respective mapped storage clusters to the storage resources of the real storage cluster.

10. The system of claim 9, wherein the combining the respective numbers of the logical columns of the respective mapped storage clusters into the logical column group of columns comprises sorting the respective numbers of the logical columns based on height into the logical column group of columns.

11. The system of claim 9, wherein the respective numbers of the logical columns of the group are associated with height information, and wherein the selecting the logical column from the logical column group of columns as the selected column comprises selecting, as the selected column, the logical column based on the height information.

12. The system of claim 9, wherein the mapped nodes are horizontally represented in the logical rectangle and the respective numbers of the logical columns are vertically represented within the logical rectangle, and wherein the selecting the logical column from the logical column group of columns as the selected column comprises skipping over an available logical column in the logical column group of columns in response to determining that the available logical column belongs to a first mapped storage cluster and determining that the selected column space is vertically aligned with a previously selected column space in which a previously selected column that belongs to the first mapped storage cluster is positioned.

13. The method of claim 9, further comprising, facilitating, by the system, a data operation that references a mapped storage resource of the respective mapped storage clusters to occur in a storage resource of the storage resources of the real storage cluster based on the mapping the respective numbers of storage resources of the respective mapped storage clusters to the storage resources of the real storage cluster.

14. The method of claim 9, wherein the selecting, as the selected column space, the available column space comprises determining the available column space using a back-and-forth horizontal, and one-directional vertical, selection pattern.

15. The method of claim 9, wherein the selecting, as the selected column space, the available column space within the logical rectangle comprises selecting, in a left-to-right selection pattern, a highest and leftmost column space that is available until a rightmost boundary of the logical rectangle is reached, and then selecting, in a right-to-left selection pattern, a highest and rightmost column space that is available until a leftmost boundary of the logical rectangle is reached.

16. The method of claim 9, wherein the columns of the logical column group are associated with height information, wherein the selecting the logical column from the logical column group as the selected column comprises selecting, as the selected column, the logical column having a greatest height based on the height information, and wherein the selecting, as the selected column space, the available column space within the logical rectangle comprises determining, in a left-to-right selection pattern, a highest and leftmost column space that is available until a rightmost boundary of the logical rectangle is reached, and then determining, in a right-to-left selection pattern, a highest and rightmost column space that is available until a leftmost boundary of the logical rectangle is reached.

17. A non-transitory machine-readable medium, comprising executable instructions that, when executed by a processor, facilitate performance of operations, the operations comprising:
　associating columns representing mapped nodes of mapped storage clusters with height information, wherein the height information of a column of the columns corresponds to a number of storage resources managed by a mapped node represented by the column;
　selecting a column space of column spaces, and column pairings for logical positioning within a logical rectangle that represents real node-horizontal and real storage resource-vertical dimensions of a real storage cluster associated with the mapped storage clusters, wherein the column spaces are selected within the logical rectangle using a back-and-forth horizontal, and one-directional vertical, selection pattern, and the columns are selected based on respective height information; and
　based on the column space, and the column pairings, mapping the number of the storage resources of the mapped storage clusters to storage resources of a real storage cluster being allocated.

18. The non-transitory machine-readable medium of claim 17, wherein the selecting the column space, and the column pairings further comprises evaluating whether a first candidate column for the column space, and a column pairing of the column pairings violates a constraint that avoids having two columns of a common mapped storage cluster mapped to a real node of the real storage cluster, and
　　in response to the constraint being determined not to have been violated by the column space and the column pairing, forming a first candidate column pairing, and using the first candidate column for the column space, and the given column pairing, and
　　in response to the constraint being determined to have been violated by the column space and the column pairing, forming the first candidate column pairing, locating a second candidate column that does not violate the constraint, and using the second candidate column for the column space, and the column pairing.

19. The non-transitory machine-readable medium of claim 17, wherein the selecting the column space, and the column pairings using the back-and-forth horizontal and the one-directional vertical selection pattern comprises locating, for a selected column, the column space that is not previously paired with a column, using a left-to-right horizontal, one-directional vertical selection pattern until a rightmost boundary is reached, and then using a right-to-left horizontal, one-directional vertical selection pattern until a leftmost boundary is reached.

20. The non-transitory machine-readable medium of claim 17, wherein the selecting the column space, and the column pairings comprises selecting a first column that is not previously selected based on first height information associated with the first column that indicates the first column has a greater height than a second column based on second height information associated with the second column.

\* \* \* \* \*